United States Patent
Kim et al.

(10) Patent No.: US 12,517,290 B2
(45) Date of Patent: Jan. 6, 2026

(54) OPTICAL FILTER, AND IMAGE SENSOR AND ELECTRONIC DEVICE INCLUDING OPTICAL FILTER

(71) Applicant: SAMSUNG ELECTRONICS CO., LTD., Suwon-si (KR)

(72) Inventors: Hyochul Kim, Suwon-si (KR); Moonsook Lee, Suwon-si (KR); Younggeun Roh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 312 days.

(21) Appl. No.: 18/077,777

(22) Filed: Dec. 8, 2022

(65) Prior Publication Data
US 2023/0185005 A1 Jun. 15, 2023

(30) Foreign Application Priority Data
Dec. 10, 2021 (KR) .................. 10-2021-0176938

(51) Int. Cl.
*G02B 5/20* (2006.01)
*G02B 5/28* (2006.01)
*G02B 5/30* (2006.01)
*H10F 39/00* (2025.01)

(52) U.S. Cl.
CPC ............ *G02B 5/201* (2013.01); *G02B 5/284* (2013.01); *G02B 5/3058* (2013.01); *H10F 39/8053* (2025.01)

(58) Field of Classification Search
CPC ...... H04N 5/23229; G01J 3/12; G01J 3/2823; G01J 3/28; G01J 2003/1213; G01J 2003/2826; G02B 5/288; G02B 5/201; G02B 5/284; H01L 27/14625; H01L 27/14621
See application file for complete search history.

(56) References Cited

U.S. PATENT DOCUMENTS

| | | | |
|---|---|---|---|
| 5,726,805 | A | 3/1998 | Kaushik et al. |
| 6,958,729 | B1 | 10/2005 | Metz |
| 8,045,157 | B2 | 10/2011 | Shibayama et al. |
| 10,170,509 | B2 | 1/2019 | Ockenfuss |

(Continued)

FOREIGN PATENT DOCUMENTS

| | | |
|---|---|---|
| DE | 102010041569 A1 | 3/2012 |
| DE | 102012217093 A1 | 4/2014 |

(Continued)

OTHER PUBLICATIONS

Communication issued Apr. 14, 2023 by the European Patent Office in European Patent Application No. 22209397.3.

(Continued)

*Primary Examiner* — Xi Wang
(74) *Attorney, Agent, or Firm* — Sughrue Mion, PLLC

(57) ABSTRACT

An optical filter includes an active filter region including at least one of a spectral filter and a polarizing filter; and a reference filter region configured to sense an amount of light passing through the active filter region, wherein the reference filter region includes a gray filter and at least one of a black filter and a transparent filter, wherein the gray filter has a transmittance that is higher than a transmittance of the black filter and lower than a transmittance of the transparent filter.

16 Claims, 23 Drawing Sheets

(56) References Cited

U.S. PATENT DOCUMENTS

| | | |
|---|---|---|
| 10,728,479 B2 | 7/2020 | Lee et al. |
| 10,942,304 B2 | 3/2021 | Higashitani et al. |
| 2010/0053385 A1 | 3/2010 | Choe et al. |
| 2010/0321542 A1 | 12/2010 | Koskinen et al. |
| 2011/0304751 A1* | 12/2011 | Joboji .................. H04N 25/677 348/300 |
| 2012/0147212 A1* | 6/2012 | Hara .................... H04N 23/672 348/E9.051 |
| 2013/0242131 A1 | 9/2013 | Timm et al. |
| 2014/0061486 A1 | 3/2014 | Bao et al. |
| 2014/0146207 A1 | 5/2014 | Yokogawa |
| 2014/0233105 A1* | 8/2014 | Schmeder .............. G02B 5/201 359/590 |
| 2015/0103401 A1 | 4/2015 | Park et al. |
| 2015/0219809 A1 | 8/2015 | Ruhnau et al. |
| 2015/0276478 A1 | 10/2015 | Geelen et al. |
| 2017/0276849 A1 | 9/2017 | Langner et al. |
| 2018/0045953 A1 | 2/2018 | Fan et al. |
| 2018/0266878 A1 | 9/2018 | Jacobs et al. |
| 2019/0006407 A1 | 1/2019 | Uesaka |
| 2019/0041559 A1 | 2/2019 | Higashitani et al. |
| 2019/0049296 A1 | 2/2019 | Cho et al. |
| 2019/0086259 A1 | 3/2019 | Cho |
| 2019/0277693 A1 | 9/2019 | Kim et al. |
| 2019/0348455 A1 | 11/2019 | Cheng et al. |
| 2020/0314983 A1 | 10/2020 | Park et al. |
| 2021/0118931 A1 | 4/2021 | Matsunuma et al. |
| 2021/0127101 A1 | 4/2021 | Roh et al. |
| 2021/0187907 A1 | 6/2021 | Lee et al. |
| 2021/0191141 A1 | 6/2021 | Park et al. |
| 2021/0211617 A1 | 7/2021 | Ono |
| 2021/0280618 A1* | 9/2021 | Yamashita ........ H01L 27/14621 |
| 2021/0318171 A1* | 10/2021 | Inada .................... G01J 3/2803 |
| 2022/0003906 A1 | 1/2022 | Kim et al. |
| 2022/0132052 A1* | 4/2022 | Mojaver ............ A61B 5/02433 |
| 2023/0093853 A1 | 3/2023 | Kim et al. |
| 2023/0251408 A1 | 8/2023 | Kim et al. |
| 2024/0127574 A1* | 4/2024 | Kiyohara ............... G06V 20/70 |

FOREIGN PATENT DOCUMENTS

| | | |
|---|---|---|
| EP | 2085762 A2 | 8/2009 |
| EP | 3896966 A1 | 10/2021 |
| EP | 3913341 A1 | 11/2021 |
| JP | 4967427 B2 | 7/2012 |
| JP | 2016-72266 A | 5/2016 |
| JP | 5936098 B2 | 6/2016 |
| KR | 10-2009-0083818 A | 8/2009 |
| KR | 10-2017-0069253 A | 6/2017 |
| KR | 10-2018-0021614 A | 3/2018 |
| KR | 10-2021-0079824 A | 6/2021 |

OTHER PUBLICATIONS

Communication dated Nov. 26, 2024, issued in Korean Intellectual Property Office in Korean Patent Application No. 10-2021-0176938.

* cited by examiner

OPTICAL FILTER, AND IMAGE SENSOR AND ELECTRONIC DEVICE INCLUDING OPTICAL FILTER

CROSS-REFERENCE TO RELATED APPLICATION

This application is based on and claims priority under 35 U.S.C. § 119 to Korean Patent Application No. 10-2021-0176938, filed on Dec. 10, 2021, in the Korean Intellectual Property Office, the disclosure of which is incorporated by reference herein in its entirety.

BACKGROUND

1. Field

The present disclosure relates to an optical filter, an image sensor including the optical filter, and an electronic device including the image sensor.

2. Description of the Related Art

In the related art, image sensors divide a wavelength band into only three sections of red (R), green (G), and blue (B). However, limitation to detection of only three sections of a wavelength band may limit the accuracy of color expression in image generation and a performance of object recognition in image analysis. Accordingly it may be desirable for development of an image sensor including a spectral filter which divides a wavelength band into more than three sections. However, spectral filters in the related art are used for dedicated cameras that include large and complex optical elements, and a technology of a module of an image sensor in which a spectral filter is integrated with a semiconductor chip is still being researched and developed.

SUMMARY

Provided are an optical filter, an image sensor including the optical filter, and an electronic device including the image sensor.

Additional aspects will be set forth in part in the description which follows and, in part, will be apparent from the description, or may be learned by practice of the presented embodiments of the disclosure.

According to an aspect of an example embodiment, an optical filter includes: an active filter region including at least one of a spectral filter and a polarizing filter; and a reference filter region configured to sense an amount of light passing through the active filter region, wherein the reference filter region includes a gray filter and at least one of a black filter and a transparent filter, wherein the gray filter has a transmittance that is higher than a transmittance of the black filter and lower than a transmittance of the transparent filter.

The transmittance of the gray filter may be in a range of 5% to 90%.

The gray filter may include a plurality of partial gray filters having transmittances that are different from one another.

The reference filter region may be outside the active filter region.

The reference filter region may include the black filter and the gray filter, the black filter may be outside of the active filter region, and the gray filter may be outside of the black filter.

The reference filter region may further include the transparent filter, and the transparent filter may be outside of the gray filter.

The reference filter region may include the gray filter and the transparent filter, the gray filter may be outside of the active filter region, and the transparent filter may be outside of the gray filter.

The optical filter may further include: a plurality of unit filter arrays; a plurality of active filter regions including the active filter region; and a plurality of reference filter regions including the reference filter region, wherein each of the plurality of unit filter arrays may include a corresponding active filter region of the plurality of active filter regions and a corresponding reference filter region of the plurality of reference filter regions.

Each of the plurality of reference filter regions may include the black filter and the gray filter.

Each of the plurality of reference filter regions further may include the transparent filter.

Each of the plurality of reference filter regions may include the gray filter and the transparent filter.

The active filter region may include the spectral filter, and the spectral filter may include at least four spectral unit filters having central wavelengths that are different from one another.

Each of the four or more spectral unit filters may include a lower metal reflective plate and an upper metal reflective plate, the lower metal reflective plate defines a first cavity, and the upper metal reflective plate may be provided in the first cavity.

An effective refractive index or a thickness of the first cavity of each spectral unit filter of the at least four spectral unit filters corresponds to a central wavelength of the spectral unit filter.

Each of the at least four spectral unit filters further may include a lower dielectric layer provided on a lower portion of the lower metal reflective plate.

Each of the at least four spectral unit filters further may include an upper dielectric layer provided on an upper portion of the upper metal reflective plate.

An effective refractive index or a thickness of each of the lower dielectric layer and the upper dielectric layer of each spectral unit filter of the at least four spectral unit filters corresponds to a central wavelength of the spectral unit filter.

The active filter region may include the polarizing filter, and the polarizing filter may include a plurality of polarizing unit filters having central wavelengths that are different from one another.

Each of the plurality of polarizing unit filters may include a lower metal reflective plate and a polarizer, the lower metal reflective plate defines a second cavity, and the polarizer may be provided in the second cavity.

The polarizer may include a metal grid.

According to an aspect of an example embodiment, an optical filter includes: an active filter region including at least one of a spectral filter and a polarizing filter; and a reference filter region configured to sense an amount of light passing through the active filter region, the reference filter region including a black filter and a transparent filter.

The reference filter region may be outside of the active filter region.

The black filter may be outside of the active filter region, and the transparent filter may be outside of the black filter.

The optical filter may further include: a plurality of unit filter arrays; a plurality of active filter regions including the active filter region; a plurality of reference filter regions including the reference filter region, and each of the plurality of unit filter arrays may include a corresponding active filter region of the plurality of active filter regions and a corresponding reference filter region of the plurality of reference filter regions.

The active filter region may include the spectral filter, and the spectral filter may include at least four spectral unit filters having central wavelengths that are different from one another.

Each of the at least four spectral unit filters may include a lower metal reflective plate and an upper metal reflective plate, the lower metal reflective plate defines a first cavity, and the upper metal reflective plate may be provided within the first cavity.

The active filter region may include the polarizing filter, and the polarizing filter may include a plurality of polarizing unit filters having central wavelengths that are different from one another.

Each of the plurality of polarizing unit filters may include a lower metal reflective plate and a polarizer, the lower metal reflective plate defines a second cavity, and the polarizer may be provided within the second cavity.

According to an aspect of an example embodiment, an image sensor includes: a pixel array including a plurality of pixels; and an optical filter provided on the pixel array, wherein the optical filter includes: an active filter region including at least one of a spectral filter and a polarizing filter; and a reference filter region configured to sense an amount of light passing through the active filter region, wherein the reference filter region includes a gray filter and at least one of a black filter and a transparent filter, and wherein the gray filter has a transmittance may be higher than a transmittance of the black filter and lower than a transmittance of the transparent filter.

The image sensor may further include a timing controller, a row decoder, and an output circuit.

According to an aspect of an example embodiment, electronic device including an image sensor, includes: a pixel array including a plurality of pixels; and an optical filter provided on the pixel array, wherein the optical filter includes: an active filter region including at least one of a spectral filter and a polarizing filter; and a reference filter region configured to sense an amount of light passing through the active filter region, wherein the reference filter region includes a gray filter and at least one of a black filter and a transparent filter, and wherein the gray filter has a transmittance may be higher than a transmittance of the black filter and lower than a transmittance of the transparent filter.

The electronic device may further include: a mobile phone, a smartphone, a tablet, a smart tablet, a digital camera, a camcorder, a notebook computer, a television, a smart television, a smart refrigerator, a security camera, a robot, or a medical camera.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
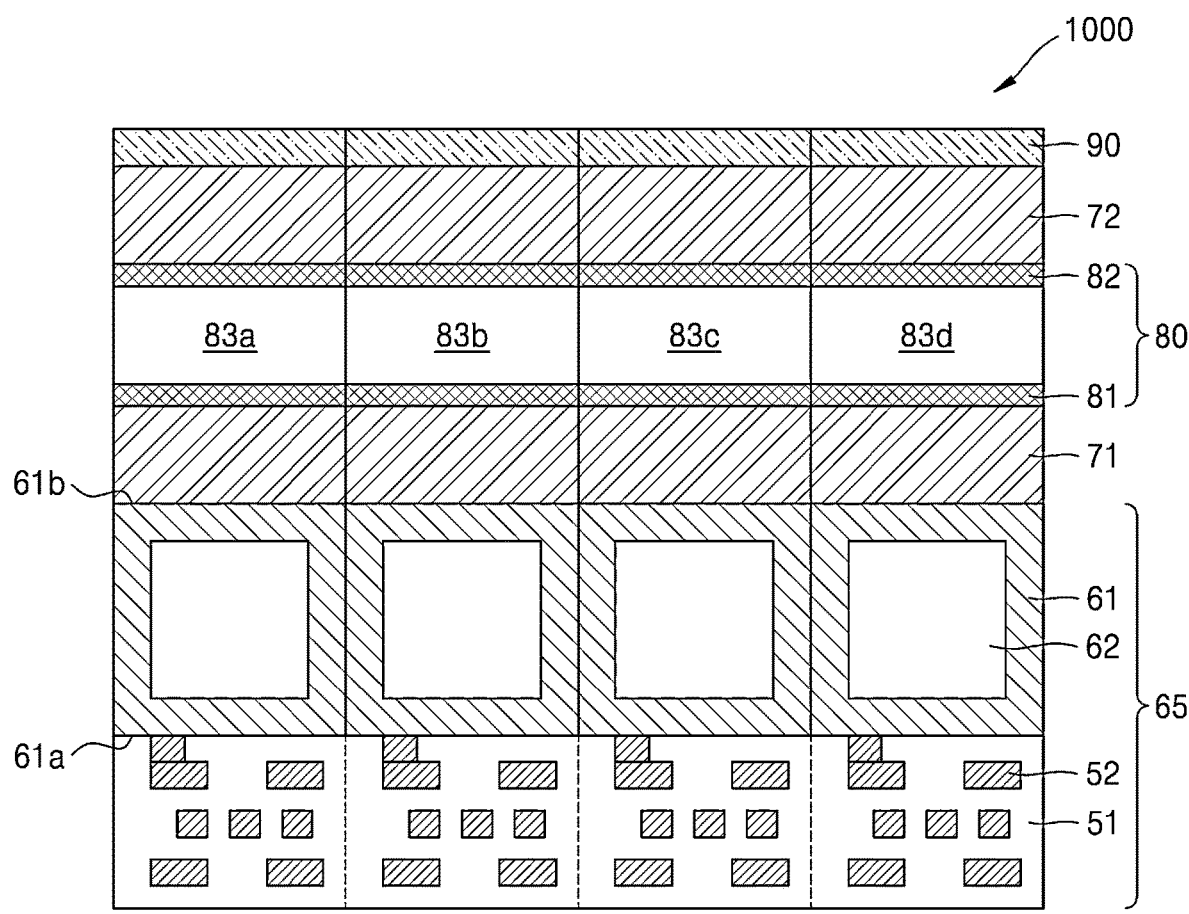
FIG. 1 is a schematic cross-sectional view of an image sensor according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. Like reference numerals in the drawings denote like elements, and the size of each element in the drawings may be exaggerated for clarity and convenience of description. Meanwhile, embodiments described below are merely examples, and various modifications may be made from these embodiments.

Hereinafter, what is described as "above" or "on" may include those directly on, underneath, left, and right in contact, as well as above, below, left, and right in non-contact. The singular forms are intended to include the plural forms as well, unless the context clearly indicates otherwise. Also, when a part "includes" any element, it means that the part may further include other elements, rather than excluding other elements, unless otherwise stated.

The term "the" and the similar indicative terms may be used in both the singular and the plural. If there is no explicit description of the order of steps constituting a method or no contrary description thereto, these steps may be performed in an appropriate order, and are not limited to the order described.

In addition, the terms " . . . unit", "module", etc. described herein mean a unit that processes at least one function or operation, may be implemented as hardware or software, or may be implemented as a combination of hardware and software.

Connections of lines or connection members between elements shown in the drawings are illustrative of functional connections and/or physical or circuitry connections, and may be replaced in an actual device, or may be represented as additional various functional connections, physical connections, or circuitry connections.

The use of all examples or example terms is merely for describing the technical concept in detail, and the scope thereof is not limited by these examples or example terms unless limited by claims.

FIG. 1 is a schematic cross-sectional view of an image sensor 1000 according to an example embodiment. The image sensor 1000 shown in FIG. 1 may include, for example, a complementary metal oxide semiconductor (CMOS) image sensor or a charged coupled device (CCD) image sensor.

Referring to FIG. 1, the image sensor 1000 may include a pixel array 65 and a resonator structure 80 provided above the pixel array 65. Here, the pixel array 65 may include a plurality of pixels arranged in two dimensions, and the resonator structure 80 may include a plurality of resonators provided to correspond to the plurality of pixels. FIG. 1 illustrates an example in which the pixel array 65 includes four pixels and the resonator structure 80 includes four resonators.

Each pixel in the pixel array 65 may include a photodiode 62, which may be a photoelectric transformation element, and a driving circuit 52 configured to drive the photodiode 62. The photodiode 62 may be disposed in a semiconductor substrate 61, which has two surfaces 61a, 61b that face each other. A silicon substrate, for example, may be used as the semiconductor substrate 61. However, embodiments are not limited thereto. A wiring layer 51 may be provided on or under the semiconductor substrate 61, and for example, the driving circuit 52 such as a metal oxide semiconductor field effect transistor (MOSFET) may be provided in the wiring layer 51.

The resonator structure 80 including the plurality of resonators may be provided above the semiconductor substrate 61. The resonators may respectively transmit light of desired specific wavelength ranges. The plurality of resonators may include a first reflective layer 81 and a second reflective layer 82, which spaced provided apart from each other by cavities 83a, 83b, 83c, and 83d provided between the first reflective layer 81 and the second reflective layer 82. Each of the first reflective layer 81 and second reflective layer 82 may include, for example, a metal reflective layer or a Bragg reflective layer. Each of the cavities 83a, 83b, 83c, and 83d may resonate light of desired specific wavelength ranges.

A first function layer 71 may be provided between a top surface of the semiconductor substrate 61 and the resonator structure 80. The first function layer 71 may be configured to, for example, improve a transmittance of light that is transmitted through the resonator structure 80 and incident to the photodiode 62. To this end, the first function layer 71 may have a dielectric layer or a dielectric pattern having an adjusted transmittance.

A second function layer 72 may be provided above the resonator structure 80. The second function layer 72 may be configured to, for example, improve a transmittance of light incident to the resonator structure 80. To this end, the second function layer 72 may include a dielectric layer or a dielectric pattern having an adjusted transmittance. A third function layer 90 may be further provided above the second function layer 72. The third function layer 90 may include, for example, an antireflection layer, a condenser lens, a color filter, a short wavelength absorption filter, and/or a long wavelength absorption filter. However, this is merely an example.

At least one of the first function layer 71, the second function layer 72, and the third function layer 90 described above, together with the resonator structure 80, may configure an optical filter to be described later. Hereinafter, an optical filter according to an example embodiment will be described in detail.

Figure 2:
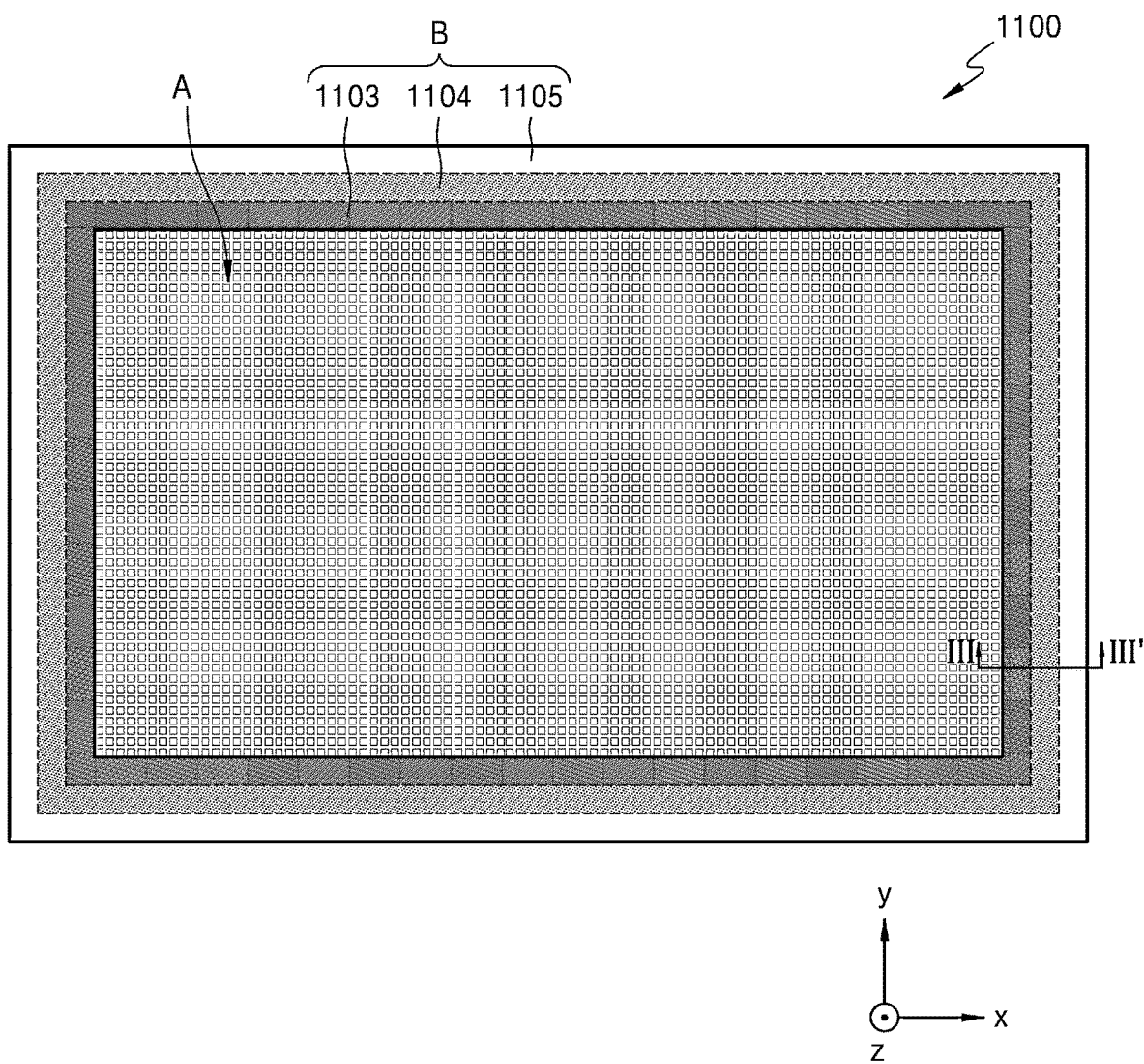
FIG. 2 is a plan view of an optical filter according to an example embodiment.

Hereinafter, an optical filter 1100 of the image sensor 1000 will be described in detail. FIG. 2 is a plan view of the optical filter 1100 according to an example embodiment.

Referring to FIG. 2, the optical filter 1100 includes an active filter region A and a reference filter region B. The pixel array 4100 including a plurality of pixels sensing light passing through the optical filter 1100 may be provided in a lower portion of the optical filter 1100. The pixel array 4100 may include active pixels (101 and 102 in FIG. 3) sensing light passing through the active filter region A and reference pixels 201, 202 and 203 sensing light passing through the reference filter region B.

The active filter region A may be provided to measure a specific light to be actually sensed, and may include a spectral filter 1101. Here, the spectral filter 1101 may include a plurality of spectral unit filters having different central wavelengths. Specifically, the spectral filter 1101 may include four or more spectral unit filters having different central wavelengths.

The reference filter region B may measure an amount of light passing through the active filter region A. Specifically, an intensity of light passing through the reference filter region B may be used as a reference value, and the reference value may be compared with an intensity of light passing through the active filter region A, and thus the amount of light passing through the active filter region A may be accurately measured. Accordingly, sensing values of the active pixels 101 and 102 with respect to lights passing through the spectral filter 1101 may be more accurately obtained.

The reference filter region B may be provided outside the active filter region A. For example, the reference filter region B may surround the active filter region A. The reference filter region B may include a black filter 1103, a gray filter 1104, and a transparent filter 1105. The black filter 1103, the gray filter 1104, and the transparent filter 1105 may sequentially surround the active filter region A. The black filter 1103 may surround the active filter region A, the gray filter 1104 may surround the black filter 1103, and the transparent filter 1105 may surround the gray filter 1104.

The black filter 1103 may substantially have a transmittance of 0%, and the transparent filter 1105 may substantially have a transmittance of 100%. In addition, the gray filter 1104 may have a transmittance higher than that of the black filter 1103 and lower than that of the transparent filter 1105. As a specific example, the gray filter 1104 may have a transmittance of approximately 5% to 90%. However, embodiments of the disclosure are not limited thereto.

Figure 3:
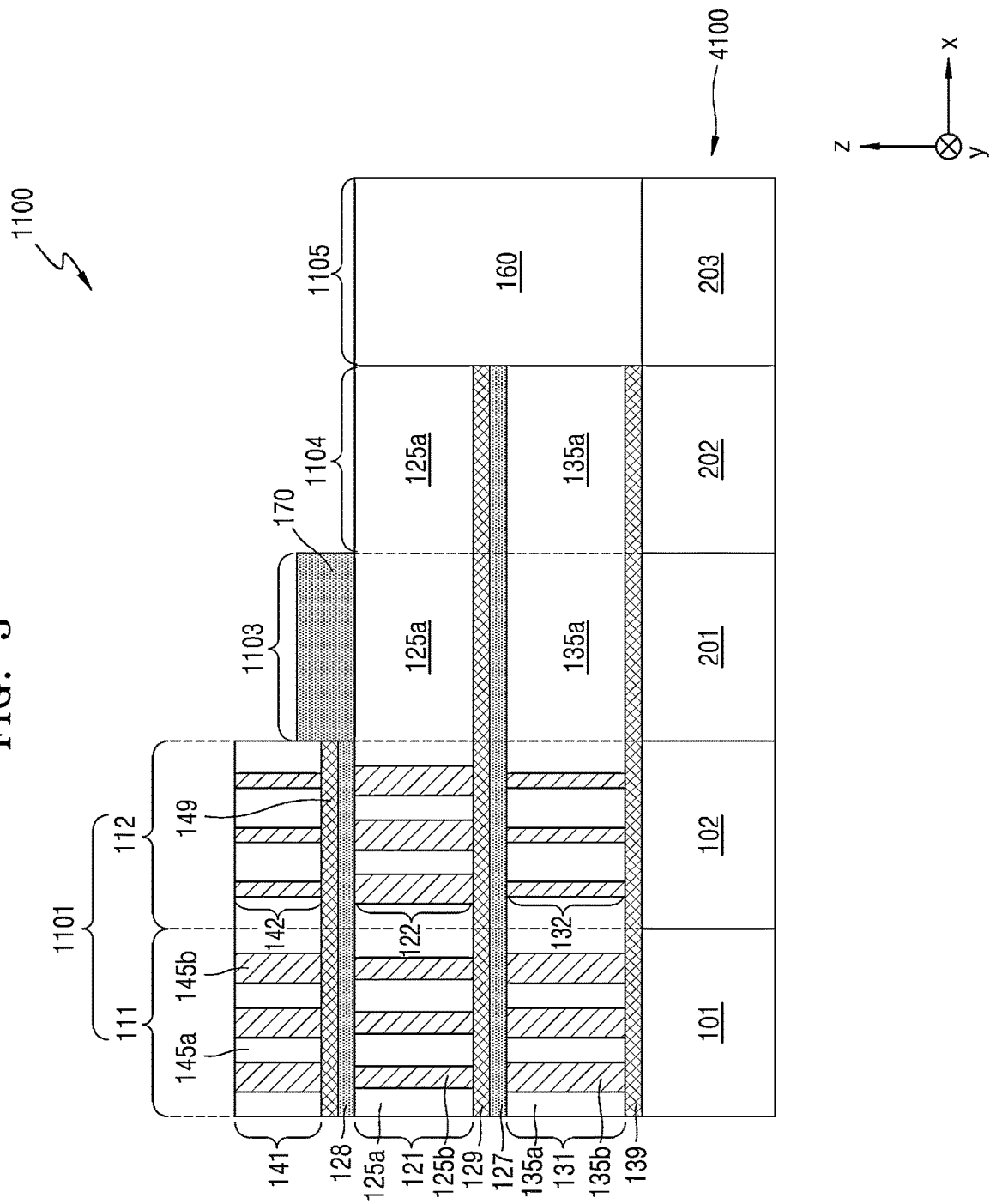
FIG. 3 is a cross-sectional view of the optical filter of FIG. 2, taken along line III-III' in FIG. 2.

FIG. 3 is a cross-sectional view of the optical filter 1100 taken along line III-III' in FIG. 2. FIG. 3 illustrates a cross section of two spectral unit filters 111 and 112, one black filter 1103, one gray filter 1104, and one transparent filter 1105.

Referring to FIG. 3, the spectral filter 1101, the black filter 1103, the gray filter 1104, and the transparent filter 1105 are arranged on an upper surface of a pixel array 4100. The spectral filter 1101 may include the first and second spectral unit filters 111 and 112 having different central wavelengths. The first and second active pixels 101 and 102 may be provided on lower portions of the first and second spectral unit filters 111 and 112, respectively, and first, second and third reference pixels 201, 202, and 203 may be provided on lower portions of the black filter 1103, the gray filter 1104, and the transparent filter 1105, respectively.

The first and second spectral unit filters 111 and 112 included in the spectral filter 1101 may have different central wavelengths. The first and second spectral unit filters 111 and 112 may include resonators having a Fabry-Perot structure. The first and second spectral unit filters 111 and 112 include a lower metal reflective plate 127, cavities 121 and 122 provided on the lower metal reflective plate 127, and an upper metal reflective plate 128 provided on the cavities 121 and 122.

When light passes through the upper metal reflective plate 128 and is incident on the cavities 121 and 122, the light may reciprocate inside the cavities 121 and 122, between the lower and upper metal reflective plates 127 and 128, and may cause constructive interference and destructive interference in this process. In addition, light having a particular central wavelength satisfying a constructive interference condition in the cavities 121 and 122 may pass through the lower metal reflective plate 127 and may be incident on the pixel array 4100.

The lower and upper metal reflective plates 127 and 128 may include a metal material capable of reflecting light having a certain wavelength region. The lower and upper metal reflective plates 127 and 128 may each include, for example, Al, Ag, Au, Cu, TiN, etc., but this is merely an example. The lower and upper metal reflective plates 127 and 128 may include the same type of metal material, but are not necessarily limited thereto.

The cavities 121 and 122 are provided between the lower and upper metal reflective plates 127 and 128. The cavities 121 and 122 may be formed to have the same thickness. Central wavelengths of the first and second spectral unit filters 111 and 112 may be determined by adjusting an effective refractive index of the first cavities 121 and 122. The cavities 121 and 122 may each include a first dielectric 125a, and a second dielectric 125b periodically arranged within the first dielectric 125a to form a pattern. The second dielectric 125b may have a different refractive index than the first dielectric 125a.

The first and second dielectrics 125a and 125b may each include, for example, silicon, silicon oxide, silicon nitride, and/or titanium oxide. As a detailed example, the first dielectric 125a may include silicon oxide, and the second dielectric 125b may include titanium oxide. However, this is merely an example. The effective refractive index of the cavities 121 and 122 may be adjusted by changing a shape and/or size of the second dielectric 125b, and accordingly, central wavelengths of the first and second spectral unit filters 111 and 112 may be determined.

An etch stop layer 129 may be further provided on lower surfaces of the cavities 121 and 122. The etch stop layer 129 further facilitates a patterning process for forming the cavities 121 and 122. The etch stop layer 129 may include, for example, silicon oxide, titanium oxide, and/or hafnium oxide, but is not limited thereto.

A lower dielectric layer may be further provided between the lower metal reflective plate 127 and the pixel array 4100. The lower dielectric layer may improve transmittance of the first and second spectral unit filters 111 and 112. The lower dielectric layer may include first lower patterned films 131 and 132 provided to correspond to different central wavelengths.

The first lower patterned films 131 and 132 may have an effective refractive index corresponding to the central wavelengths of the first and second spectral unit filters 111 and 112. The first lower patterned films 131 and 132 may each include a third dielectric 135a, and a fourth dielectric 135b periodically arranged within the third dielectric 135a to form a pattern. The fourth dielectric 135b may have a different refractive index than the third dielectric 135a. The third and fourth dielectrics 135a and 135b may each include, for example, titanium oxide, silicon nitride, hafnium oxide, silicon oxide, and/or high refractive polymer, but are not limited thereto. An effective refractive index of the first lower patterned films 131 and 132 may be adjusted by changing a shape and/or size of the fourth dielectric 135b.

An etch stop layer 139 may be further provided on lower surfaces of the first lower patterned films 131 and 132. The etch stop layer 139 may further facilitate a patterning process for forming the first lower patterned films 131 and 132. The etch stop layer 139 may include, for example, silicon oxide, titanium oxide, and/or hafnium oxide, but is not limited thereto.

An upper dielectric layer may be further provided on an upper surface of the upper metal reflective plate 128. Like the lower dielectric layer, the upper dielectric layer may improve the transmittance of the first and second spectral unit filters 111 and 112. The upper dielectric layer may include upper patterned films 141 and 142 provided to correspond to different central wavelengths. The upper patterned films 141 and 142 may have the same thickness.

The upper patterned films 141 and 142 may have an effective refractive index corresponding to the central wavelengths of the first and second spectral unit filters 111 and 112. The upper patterned films 141 and 142 may each include a fifth dielectric 145a, and a sixth dielectric 145b periodically arranged within the fifth dielectric 145a to form a pattern. The sixth dielectric 145b may have a different refractive index than the fifth dielectric 145a. The fifth and sixth dielectrics 145a and 145b may each include, for example, titanium oxide, silicon nitride, hafnium oxide, silicon oxide, and/or high refractive polymer, but are not limited thereto. The effective refractive index of the upper patterned films 141 and 142 may be adjusted by changing a shape and/or size of the sixth dielectric 145b.

An etch stop layer 149 may be further provided on lower surfaces of the upper patterned films 141 and 142. The etch stop layer 149 may further facilitate a patterning process for forming the upper patterned films 141 and 142. The etch stop layer 149 may include, for example, silicon oxide, titanium oxide, and/or hafnium oxide, but is not limited thereto.

A black filter 1103, a gray filter 1104, and a transparent filter 1105 are sequentially provided outside the spectral filter 1101. Specifically, the black filter 1103, the gray filter 1104, and the transparent filter 1105 may sequentially surround the spectral filter 1101. The black filter 1103 may include a structure having a transmittance of substantially 0%. The black filter 1103 may include, for example, a metal reflective plate 170 having a great thickness that may reflect most of incident light. However, the disclosure is not necessarily limited thereto. A partial structure of the spectral filter 1101 may be provided in a lower portion of the metal reflective plate 170. For example, the first dielectric 125a, the lower metal reflective plate 127, and the third dielectric 135a may be provided in the lower portion of the metal reflective plate 170, and the etch stop layers 129 and 139 may be further provided on a lower surface of the first dielectric 125a and a lower surface of the third dielectric 135a, respectively. As such, the black filter 1103 may share a partial structure with the spectral filter 1101. However, the disclosure is not necessarily limited thereto.

The gray filter 1104 may include a structure having a transmittance higher than that of the black filter 1103 and lower than that of the transparent filter 1105. For example, the gray filter 1104 may have a transmittance of approximately 5% to 90%, but is not limited thereto. The gray filter 1104 may have broadband transmission characteristics and non-polarization characteristics.

The gray filter 1104 may include a partial structure of the spectral filter 1101. Specifically, the gray filter 1104 may include the first dielectric 125a, the lower metal reflective plate 127, and the third dielectric 135a. In addition, the etch stop layers 129 and 139 may be further provided on the lower surface of the first dielectric 125a and the lower surface of the third dielectric 135a, respectively. A desired transmittance may be implemented by adjusting at least one of a material and a thickness of each of elements constituting the gray filter 1104. As such, the gray filter 1104 may share a partial structure with the spectral filter 1101. However, embodiments of the disclosure are not limited thereto.

The transparent filter 1105 may include a structure having a transmittance of substantially 100%. The transparent filter 1105 may include a transparent member 160 that passes through most of the incident light.

In the image sensor 1000 according to the present embodiment, the optical filter 1100 includes the reference filter region B provided around the active filter region A, and thus the amount of light passing through the active filter region A may be accurately measured. The amount of light passing through the spectral filter 1101 may be very low compared to the case in which the spectral filter 1101 is not present. In the present embodiment, the intensity of the light passing through the black filter 1103 and the transparent filter 1105 is used as a reference value and the reference value is compared with the intensity of the light passing through the spectral filter 1101, thereby accurately measuring a minute difference in the amount of light between the spectral unit filters 111 and 112.

In addition, the amount of light passing through the spectral filter 1101 may be very small compared to the amount of light passing through the transparent filter 1105, so that the amount of light passing through the transparent filter 1105 may be very greater than the amount of light passing through the spectral filter 1101, in this case, there may be a limitation in accurately measuring the difference in the amount of light between the spectral unit filters 111 and 112. In some embodiments, between the black filter 1103 and the transparent filter 1105, the gray filter 1104 having a transmittance (e.g., approximately, transmittance of 5% to 90%) higher than the black filter 1103 and lower than the transparent filter 1105, and the amount of light passing through the gray filter 1104 may be used as a reference value and compared with the amount of light passing through the spectral filter 1101, thereby more accurately measuring the minute difference in the amount of light between the spectral unit filters 111 and 112. Accordingly, sensing values of the active pixels 101 and 102 with respect to the light passing through the spectral filter 1101 may be more accurately obtained.

Figure 4:
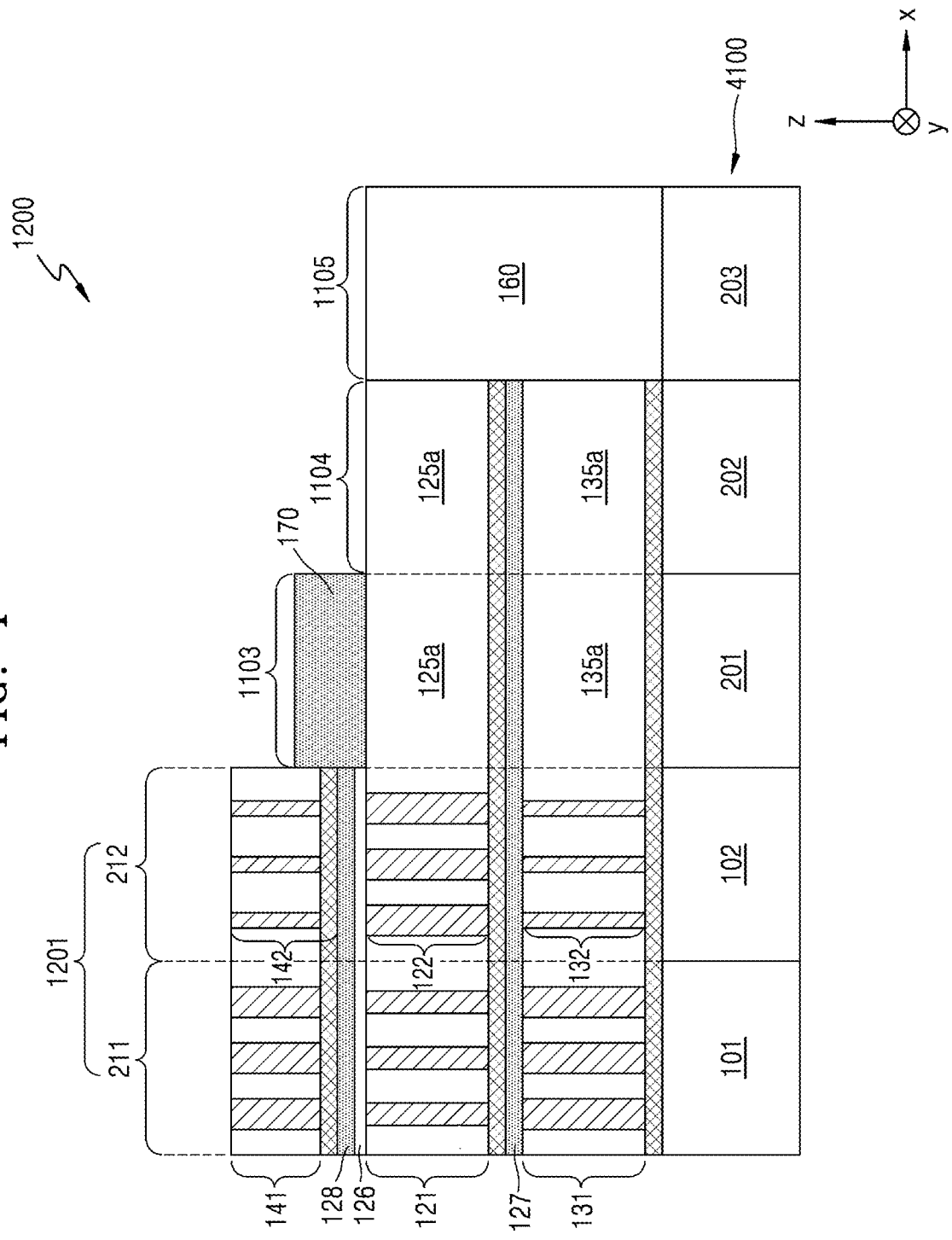
FIG. 4 is a cross-sectional view illustrating an optical filter according to another example embodiment.

FIG. 4 is a cross-sectional view illustrating an optical filter 1200 according to another example embodiment. The optical filter 1200 shown in FIG. 4 is the same as the optical filter 1100 shown in FIG. 3, except that first and second spectral unit filters 211 and 212 include a spacer 126.

Referring to FIG. 4, the optical filter 1200 includes an active filter region including a spectral filter 1201, and a reference filter region including the black filter 1103, the gray filter 1104, and the transparent filter 1105. The black filter 1103, the gray filter 1104, and the transparent filter 1105 are described above, and thus repeated descriptions thereof will be omitted.

A spectral filter 1201 includes the first and second spectral unit filters 211 and 212. Here, the first and second spectral unit filters 211 and 212 may further include the spacer 126 provided between cavities 121 and 122 and an upper metal reflective plate 128.

The cavities 121 and 122 may have a multi-mode structure having a plurality of central wavelengths. In this case, in the multi-mode structure of the cavities 121 and 122, a central wavelength of a secondary mode may be used as a central wavelength of each of the first and second spectral unit filters 211 and 212 by the spacer 126. The spacer 126 may include, for example, silicon oxide, titanium oxide, and/or silicon nitride, but this is merely an example. In the above description, both the first and second spectral unit filters 211 and 212 include the spacer 126, but only some of the first and second spectral unit filters 211 and 212 may include the spacer 126.

Figure 5:
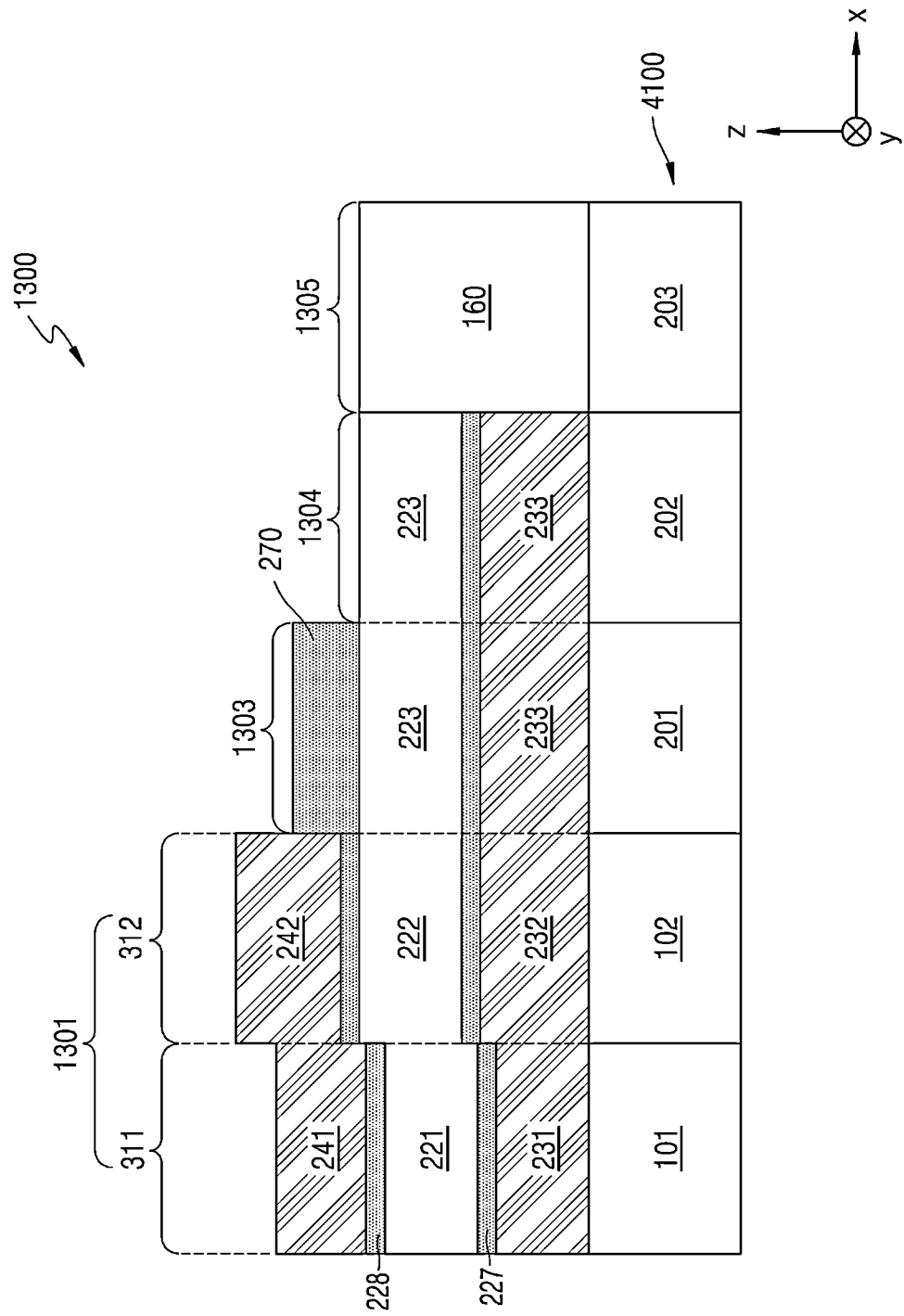
FIG. 5 is a cross-sectional view illustrating an optical filter according to another example embodiment.

FIG. 5 is a cross-sectional view illustrating an optical filter 1300 according to another example embodiment. Hereinafter, differences than the embodiments described above will be mainly described.

Referring to FIG. 5, the optical filter 1300 includes an active filter region including a spectral filter 1301, and a reference filter region including a black filter 1303, a gray filter 1304, and a transparent filter 1305.

The spectral filter 1301 may include first and second spectral unit filters 311 and 312. The first and second spectral unit filters 311 and 312 may include a lower metal reflective plate 227, cavities 221 and 222 provided on the lower metal reflective plate 227, and an upper metal reflective plate 228 provided on the cavities 221 and 222. For example, the cavities 221 and 222 may include a certain dielectric material, for example, silicon, silicon oxide, or titanium oxide. A thickness of the cavities 221 and 222 may be adjusted according to central wavelengths of the first and second spectral unit filters 311 and 312.

A lower dielectric layer may be further provided between the lower metal reflective plate 227 and a pixel array 4100. The lower dielectric layer may improve transmittance of the first and second spectral unit filters 211 and 212. The lower dielectric layer may include lower dielectric layers 231 and 232, and a thickness of the lower dielectric layers 231 and 232 may be adjusted according to the central wavelengths of the first and second spectral unit filters 311 and 312.

An upper dielectric layer may be further provided on an upper surface of the upper metal reflective plate 228. Like the lower dielectric layer, the upper dielectric layer may improve the transmittance of the first and second spectral unit filters 311 and 312. The upper dielectric layer may include upper dielectric layers 241 and 242, and a thickness of the upper dielectric layers 241 and 242 may be adjusted according to the central wavelengths of the first and second spectral unit filters 311 and 312.

The black filter 1303 may include, for example, a metal reflective plate 270 having a great thickness that may reflect most of incident light. A partial structure of the spectral filter 1301 may be provided in a lower portion of the metal reflective plate 270. For example, a first dielectric 223, a lower metal reflecting plate 227, and a second dielectric 233 may be provided under the metal reflective plate 270. Here, the first dielectric 223 may include the same dielectric material as the cavities 221 and 222, and the second dielectric 233 may include the same dielectric material as the lower dielectric layers 231 and 232. The gray filter 1304 may include the first dielectric 223, the lower metal reflective plate 227, and the second dielectric 233. Here, a desired transmittance may be implemented by adjusting at least one of a material and a thickness of each of elements constituting the gray filter 1104. The transparent filter 1305 may include the transparent member 160 that passes through most of the incident light.

Figure 6:
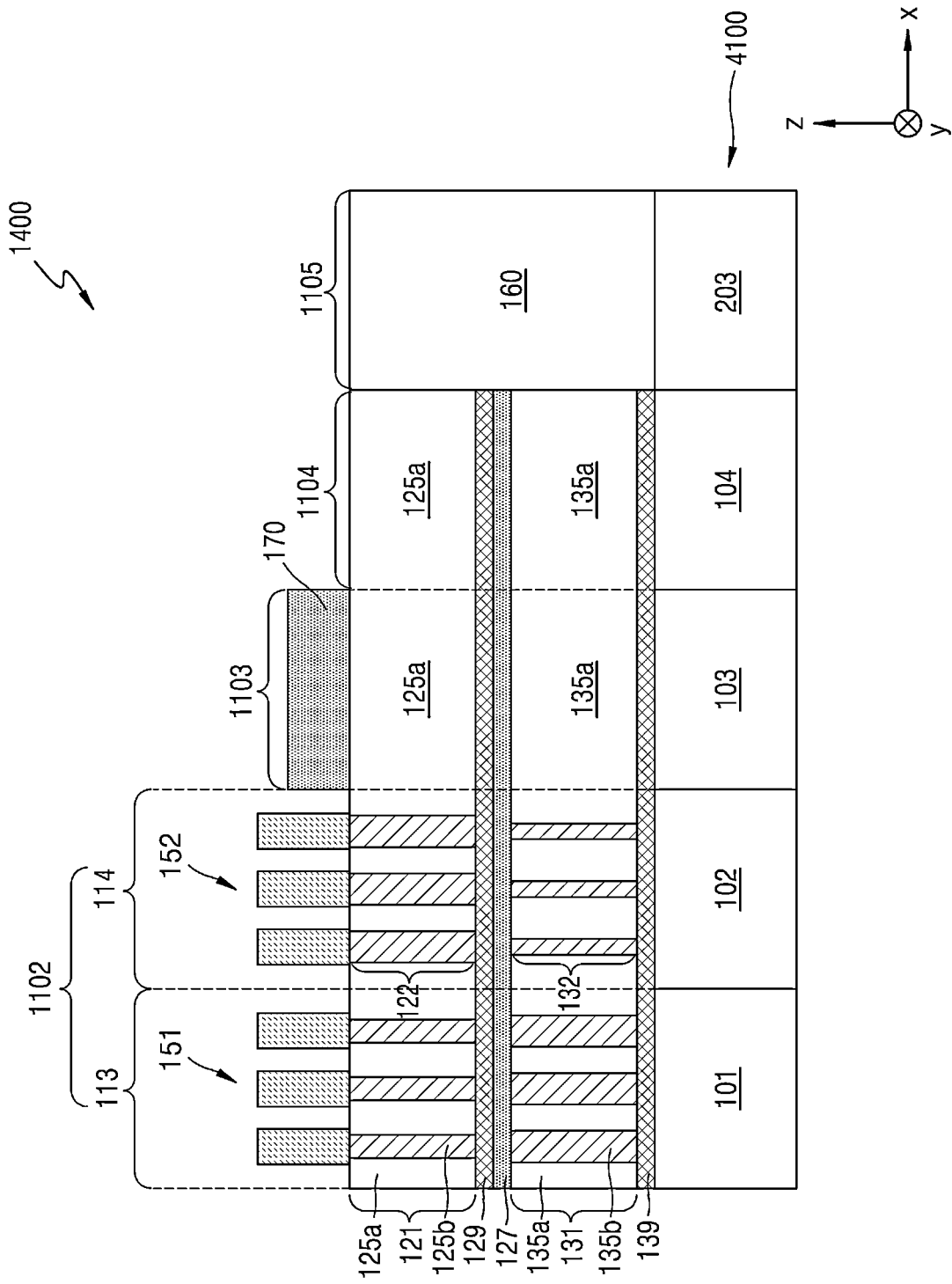
FIG. 6 is a cross-sectional view illustrating an optical filter according to another example embodiment.

FIG. 6 is a cross-sectional view illustrating an optical filter 1400 according to another example embodiment. The optical filter 1400 shown in FIG. 6 is the same as the optical filter 1100 shown in FIG. 3 except that an active filter region includes a polarizing filter 1102.

Referring to FIG. 6, the optical filter 1400 may include the active filter region including the polarizing filter 1102, and a reference filter region including the black filter 1103, the gray filter 1104, and the transparent filter 1105. The black filter 1103, the gray filter 1104, and the transparent filter 1105 are described above, and thus repeated descriptions thereof will be omitted.

The polarizing filter 1102 may include a plurality of polarization unit filters 113 and 114 having different central wavelengths. In FIG. 6, the two polarization unit filters 113 and 114 are illustrated. The first and second polarization unit filters 113 and 114 included in the polarizing filter 1102 may have different central wavelengths. The first and second polarization unit filters 113 and 114 include the lower metal reflective plate 127, cavities 123 and 124 provided on the lower metal reflective plate 127, and polarizers 151 and 152 provided on the cavities 123 and 124.

The cavities 123 and 124 are provided on the upper surface of the lower metal reflective plate 127. Central wavelengths of the first and second polarization unit filters 113 and 114 may be determined by adjusting an effective refractive index of the cavities 123 and 124. The cavities 123 and 124 may include the first dielectric 125a, and the second dielectric 125b periodically arranged within the first dielectric 125a to form a pattern. The etch stop layer 129 may be further provided on lower surfaces of the cavities 123 and 124.

The polarizers 151 and 152 may be provided on upper surfaces of the cavities 123 and 124. Each of the polarizers 151 and 152 may perform a vertical polarization function or a horizontal polarization function. Specifically, each of the polarizers 151 and 152 may allow only light having a particular polarization (e.g., a vertical polarization or a horizontal polarization) among external incident light to pass therethrough. In addition, the polarizers 151 and 152 may serve to reflect light having a certain wavelength region.

Figure 7:
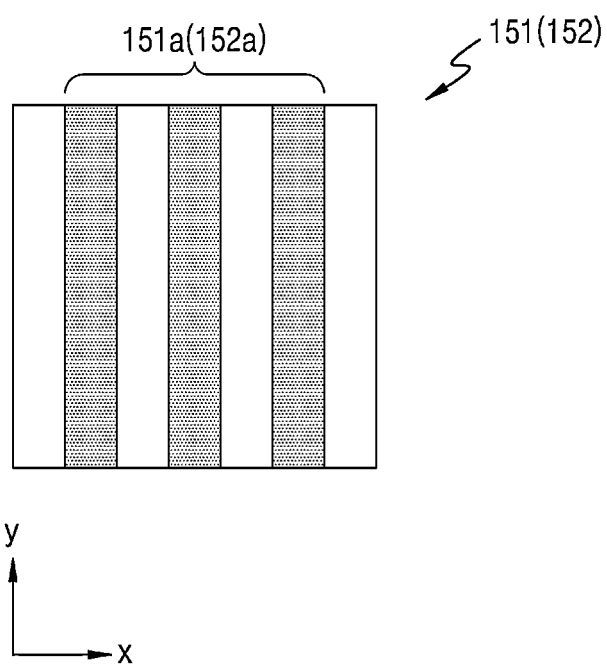
FIG. 7 is a plan view illustrating an example of a polarizer shown in FIG. 6.

FIG. 7 illustrates planes of polarizers 151 and 152. Referring to FIG. 7, the polarizers 151 and 152 may respectively include metal grids 151a and 152a. The metal grids 151a and 152a may have a shape in which linear patterns extending in a certain direction (e.g., a y-axis direction) are arranged at certain intervals. Here, air or other transparent dielectric material may be provided between the linear patterns. A pitch between the linear patterns or a material filled between linear metal patterns may vary with central wavelengths of the first and second polarization unit filters 113 and 114. The metal grids 151a and 152a may include a certain metal material. For example, in a central wavelength region of a visible light region, the metal grids 151a and 152a may include aluminum grids. However, the metal grids 151a and 152a are not necessarily limited thereto.

As light passes through the polarizers 151 and 152, only light having a particular polarization may be incident on the cavities 123 and 124. Also, the light having the particular polarization reciprocates inside the cavities 123 and 124, between the lower metal reflective plate 127 and the polarizers 151 and 52, and then, light having a particular central wavelength satisfying a constructive interference condition may pass through the lower metal reflective plate 127. The light having the particular polarization and the particular central wavelength, passing through the lower metal reflective plate 127 may be incident on the pixel array 4100.

The lower dielectric layer may be further provided between the lower metal reflective plate 127 and the pixel array 4100. The lower dielectric layer may include lower patterned films 133 and 134 provided to correspond to different central wavelengths. The lower patterned films 133 and 134 may have an effective refractive index corresponding to central wavelengths of the first and second polarization unit filters 113 and 114. The lower patterned films 133 and 134 may each include the third dielectric 135a, and the fourth dielectric 135b periodically arranged within the third dielectric 135a to form a pattern. The etch stop layer 139 may be further provided on lower surfaces of the lower patterned films 133 and 134.

Figure 8:
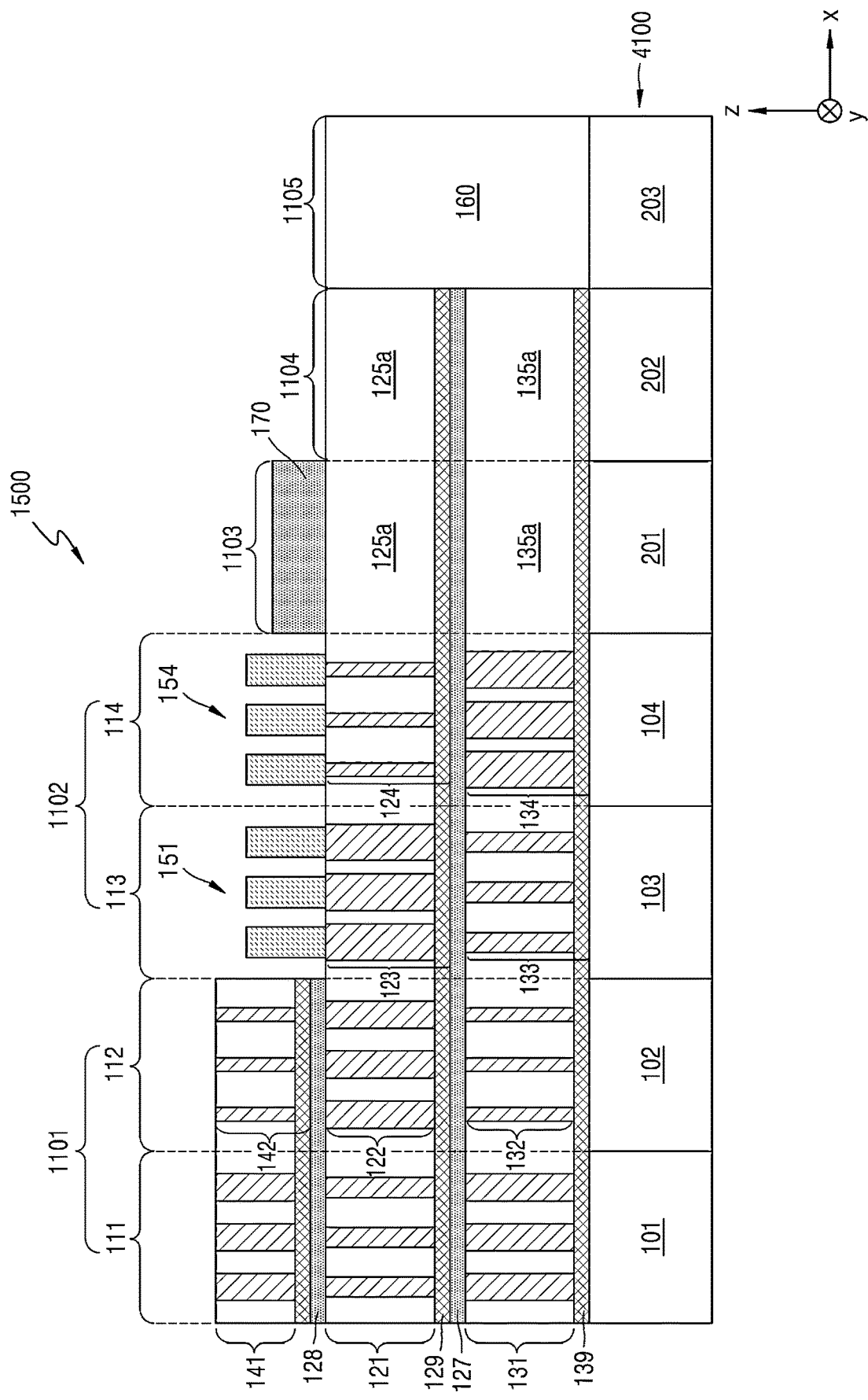
FIG. 8 is a cross-sectional view illustrating an optical filter according to another example embodiment.

FIG. 8 is a cross-sectional view illustrating an optical filter 1500 according to another example embodiment. The optical filter 1500 shown in FIG. 8 is the same as the optical filter 1100 shown in FIG. 3 except that an active filter region includes the spectral filter 1101 and the polarizing filter 1102.

Referring to FIG. 8, the optical filter 1500 includes the active filter region including the spectral filter 1101 and the polarizing filter 1102, and a reference filter region including the black filter 1103, the gray filter 1104, and the transparent filter 1105. The black filter 1103, the gray filter 1104, and the transparent filter 1105 are described above, and thus repeated descriptions thereof will be omitted.

The spectral filter 1101 may include the plurality of spectral unit filters 111 and 112 having different central wavelengths. Specifically, the spectral filter 1101 may include the four or more spectral unit filters 111 and 112 having different central wavelengths. The polarizing filter 1102 may include the plurality of polarization unit filters 113 and 114 having different central wavelengths. The spectral filter 1101 and the polarizing filter 1102 are described above, and thus repeated descriptions thereof will be omitted.

The first and second active pixels 101 and 102 may be provided on lower portions of the first and second spectral unit filters 111 and 112, respectively, and third and fourth active pixels 103 and 104 may be provided on lower portions of the first and second polarizing unit filters 113 and 114, respectively. The reference pixels 201, 202 and 203 may be provided on lower portions of the black filter 1103, the gray filter 1104, and the transparent filter 1105, respectively.

According to the present embodiment, the spectral filter 1101 may perform a spectral function, and the polarizing filter 1102 may perform a polarization function and a spectral function, thereby implementing the image sensor 1000 capable of obtaining both a spectral image and a polarized image.

Figure 9:
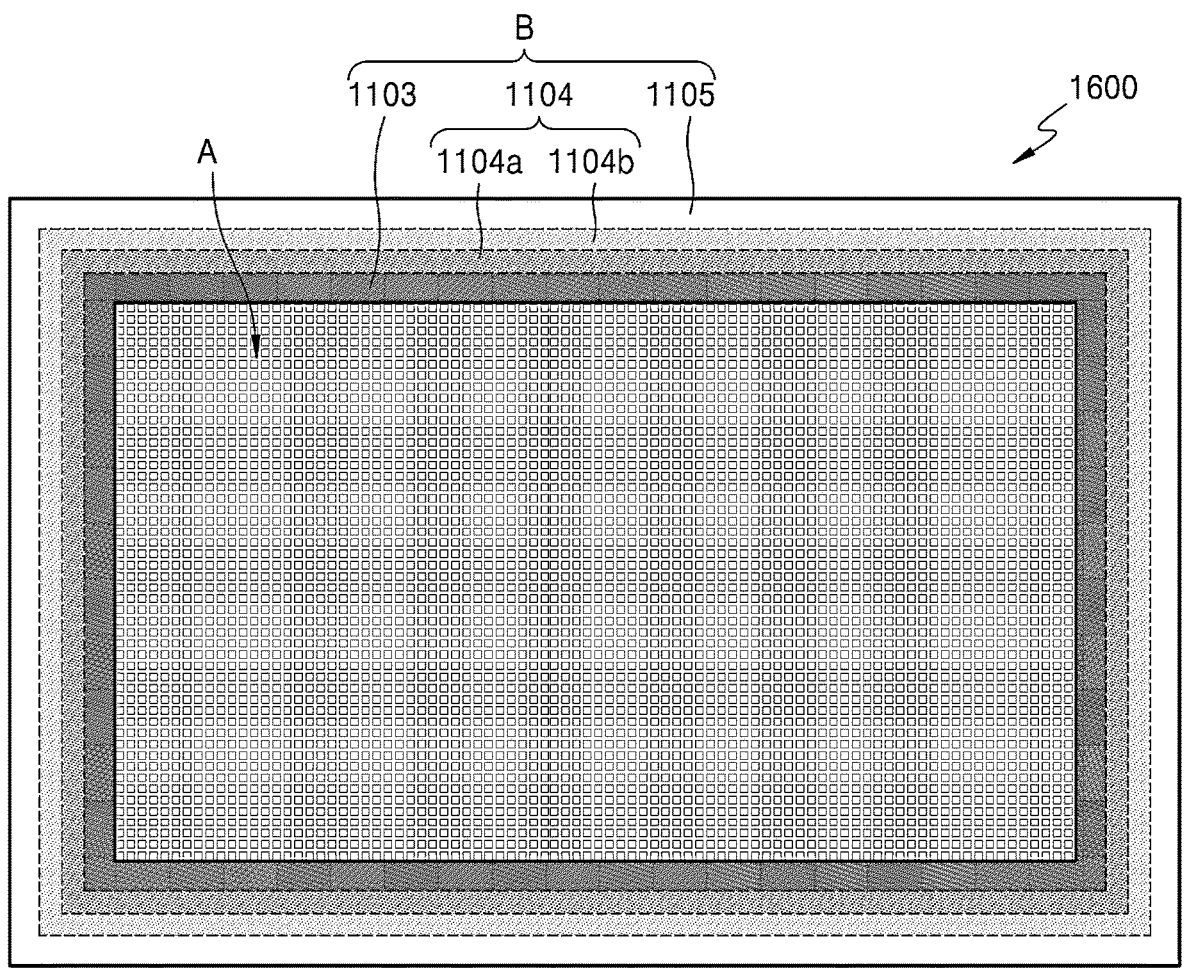
FIG. 9 is a plan view illustrating an optical filter according to another example embodiment.

FIG. 9 is a cross-sectional view illustrating an optical filter 1600 according to another example embodiment.

Referring to FIG. 9, the optical filter 1600 includes the active filter region A and the reference filter region B provided outside the active filter region A. The active filter region A may include at least one of the aforementioned spectral filter 1101 of FIG. 3 and the polarizing filter 1102 of FIG. 6. The spectral filter 1101 may include a plurality of spectral unit filters (specifically, four or more spectral unit filters) having different central wavelengths. The polarizing filter 1102 may include a plurality of polarizing unit filters having different central wavelengths. A specific structures of of the spectral filter 1101 and the polarizing filter 1102 is described above, and thus repeated descriptions thereof will be omitted.

The reference filter region B may surround the active filter region A. The reference filter region B may include the black filter 1103, the gray filter 1104, and the transparent filter 1105. The black filter 1103, the gray filter 1104, and the transparent filter 1105 may sequentially surround the active filter region A. A specific structure of each of the black filter 1103, the gray filter 1104, and the transparent filter 1105 is described above, and thus repeated description thereof will be omitted.

The black filter 1103 may substantially have a transmittance of 0%, and the transparent filter 1105 may substantially have a transmittance of 100%. In addition, the gray filter 1104 may have a transmittance (e.g., a transmittance of approximately 5% to 90%) higher than that of the black filter 1103 and lower than that of the transparent filter 1105.

The gray filter 1104 may include a plurality of partial gray filters 1104a and 1104b having different transmittances. FIG. 9 shows a case in which the gray filter 1104 includes first and second partial gray filters 1104a and 1104b having different transmittances. For example, the first and second partial gray filters 1104a and 1104b may have transmittances of 50% and 10%, respectively. However, this is merely an example.

In some embodiments, the gray filter 1104 may include the plurality of partial gray filters 1104a and 1104b having different transmittances, thereby further improving the accuracy of a sensed value with respect to light passing through the active filter region A.

Figure 10:
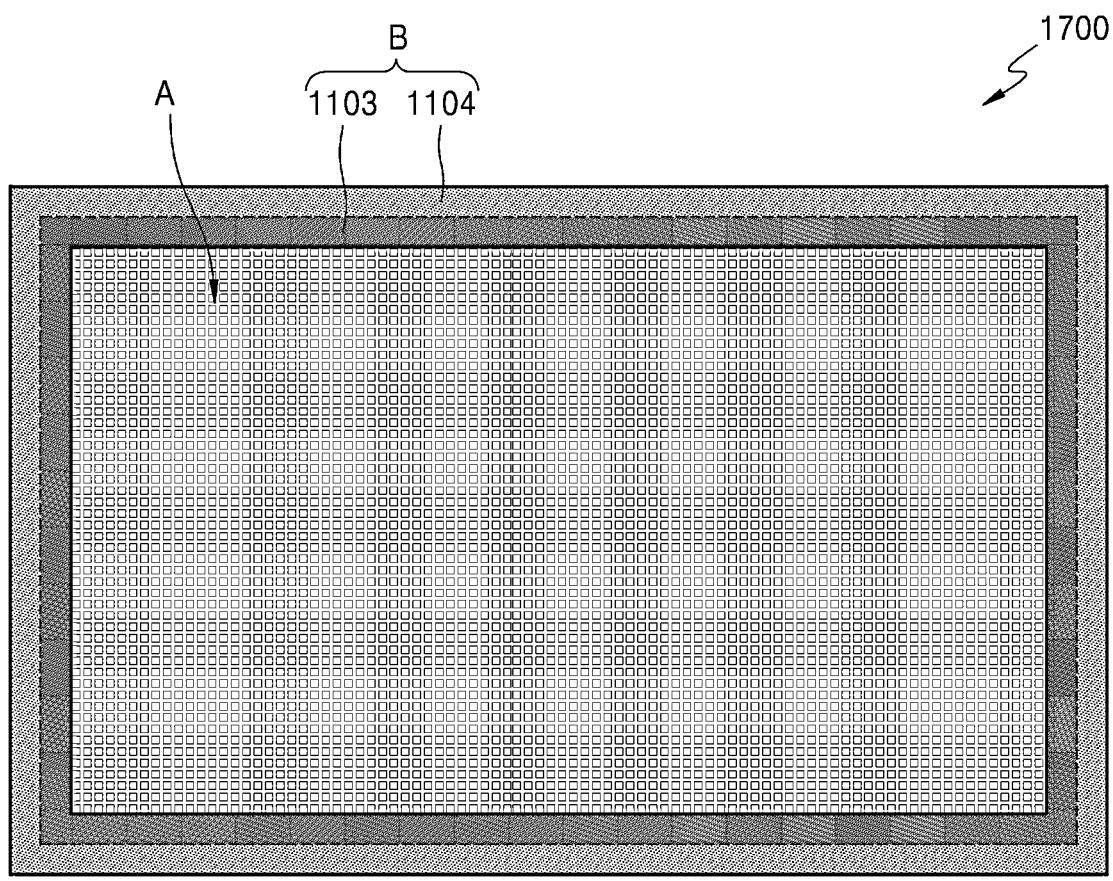
FIG. 10 is a plan view illustrating an optical filter according to another example embodiment.
Figure 10:
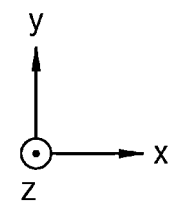

FIG. 10 is a plan view illustrating an optical filter 1700 according to another example embodiment.

Referring to FIG. 10, the optical filter 1700 includes the active filter region A and the reference filter region B provided outside the active filter region A. The active filter region A may include at least one of the spectral filter 1101 and the polarizing filter 1102.

The reference filter region B may surround the active filter region A. The reference filter region B may include the black filter 1103 and the gray filter 1104. Here, the black filter 1103 and the gray filter 1104 may sequentially surround the active filter region A. The gray filter 1104 may include a plurality of partial gray filters having different transmittances.

Figure 11:
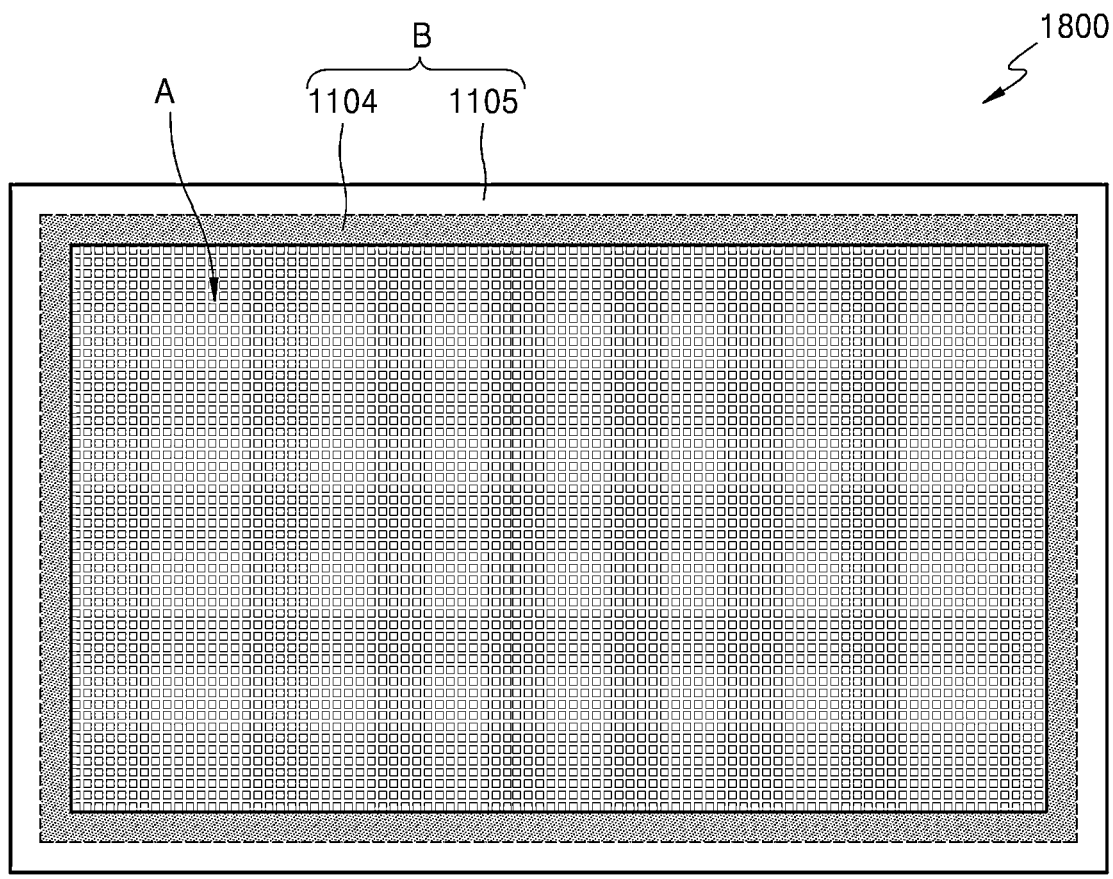
FIG. 11 is a plan view illustrating an optical filter according to another example embodiment.

FIG. 11 is a plan view illustrating an optical filter 1800 according to another example embodiment.

Referring to FIG. 11, the optical filter 1800 may include the active filter region A and the reference filter region B provided outside the active filter region A. The active filter region A may include at least one of the spectral filter 1101 and the polarizing filter 1102.

The reference filter region B may surround the active filter region A. The reference filter region B may include the black filter 1103 and the gray filter 1104. Here, the black filter 1103 and the gray filter 1104 may sequentially surround the active filter region A. The gray filter 1104 includes a plurality of partial gray filters having different transmittances.

Figure 12:
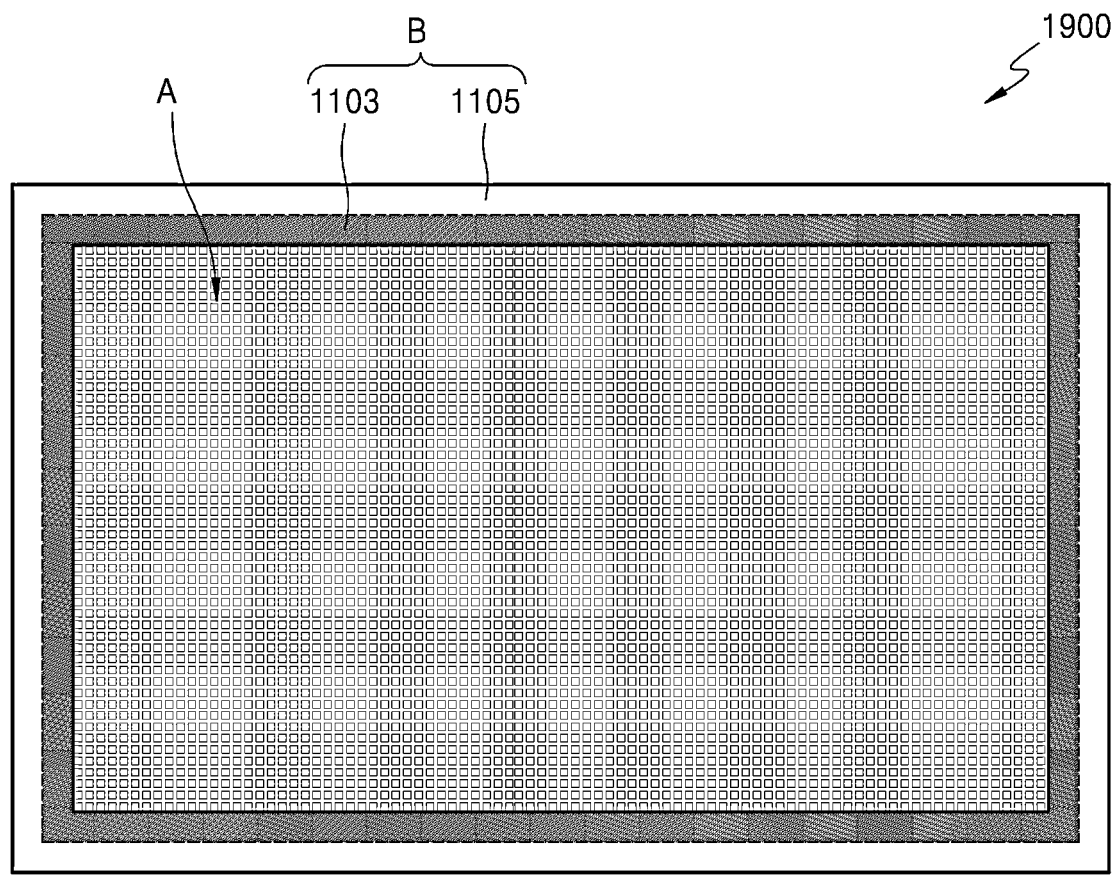
FIG. 12 is a plan view illustrating an optical filter according to another example embodiment.

FIG. 12 is a plan view illustrating an optical filter 1900 according to another example embodiment.

Referring to FIG. 12, the optical filter 1900 includes the active filter region A and the reference filter region B provided outside the active filter region A. The active filter region A may include at least one of the spectral filter 1101 and the polarizing filter 1102.

The reference filter region B may surround the active filter region A.

The reference filter region B may include the black filter 1103 and the gray filter 1104. Here, the black filter 1103 and the gray filter 1104 may sequentially surround the active filter region A.

Figure 13:
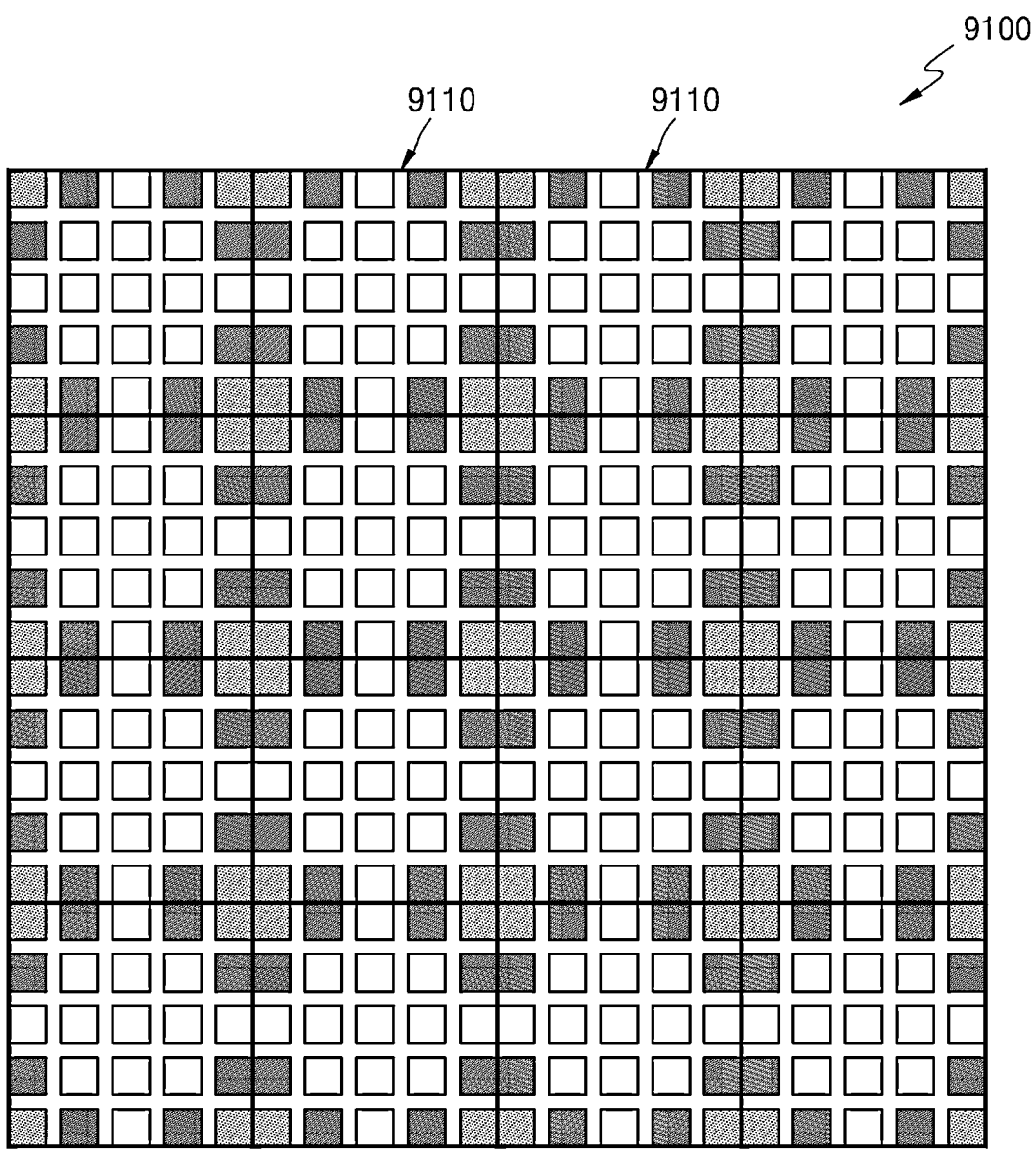
FIG. 13 is a plan view illustrating an optical filter according to another example embodiment.
Figure 14:
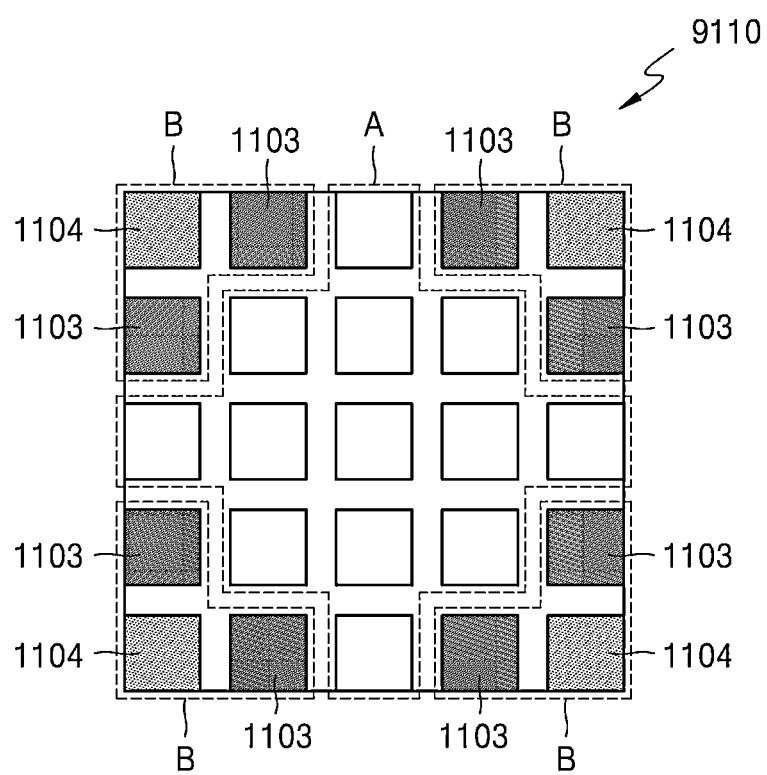
FIG. 14 illustrates a unit filter array according to the example embodiment shown in FIG. 13.

FIG. 13 is a plan view illustrating an optical filter 9100 according to another example embodiment. FIG. 14 shows the unit filter array 911 according to the example embodiment shown in FIG. 13.

Referring to FIGS. 13 and 14, the optical filter 9100 may include a plurality of unit filter arrays 9110 arranged on the same plane two-dimensionally. Here, each unit filter array 9110 may include the active filter region A and the reference filter region B. In each unit filter array 9110, the reference filter region B may be disposed outside the active filter region A.

The active filter region A may include at least one of the spectral filter 1101 of FIG. 3 and the polarizing filter 1102 of FIG. 6. The spectral filter 1101 may include a plurality of spectral unit filters (specifically, four or more spectral unit filters) having different central wavelengths. In addition, the polarizing filter 1102 may include a plurality of polarizing unit filters having different central wavelengths. A specific structure of each of the spectral filter 1101 and the polarization filter 1102 is described above, and thus repeated description thereof will be omitted.

The reference filter region B may include the black filter 1103 and the gray filter 1104 disposed outside the active filter region A. Here, the black filter 1103 may be disposed closer to the active filter region A than the gray filter 1104. A specific structure of each of the black filter 1103 and the gray filter 1104 is described above, and thus repeated description thereof will be omitted.

Figure 15:
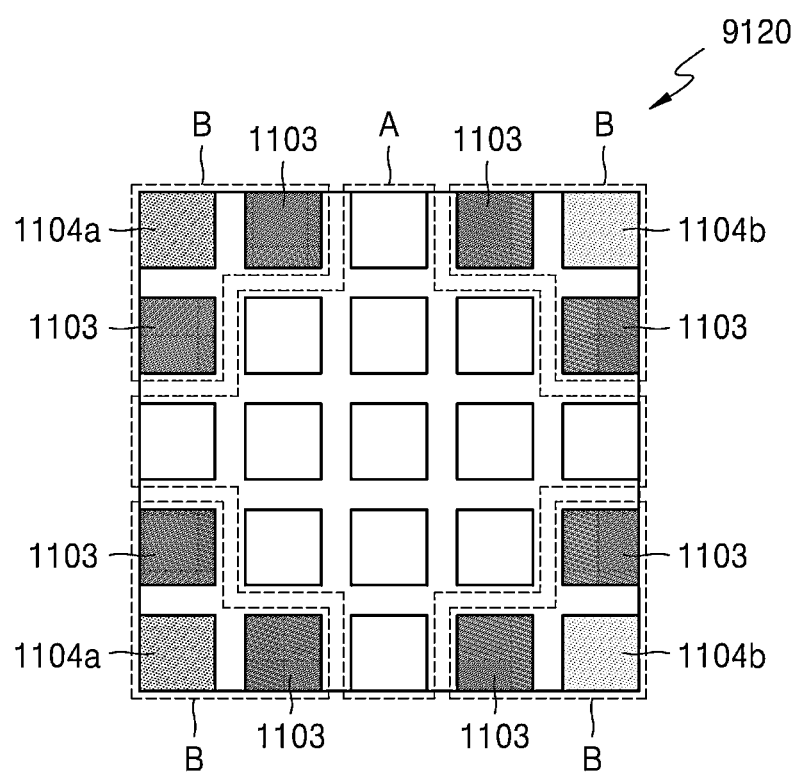
FIG. 15 illustrates a unit filter array according to another example embodiment.

FIG. 15 illustrates a unit filter array 9120 according to another example embodiment. Referring to FIG. 15, the reference filter region B may include the black filter 1103 disposed outside the active filter region A, and first and second partial gray filters 1104a and 1104b. Here, the black filter 1103 may be disposed closer to the active filter region A than the first and second partial gray filters 1104a and 1104b. The first and second partial gray filters 1104a and 1104b may have different transmittances. For example, the first and second partial gray filters 1104a and 1104b may have transmittances of 50% and 10%, respectively. However, this is merely an example.

Figure 16:
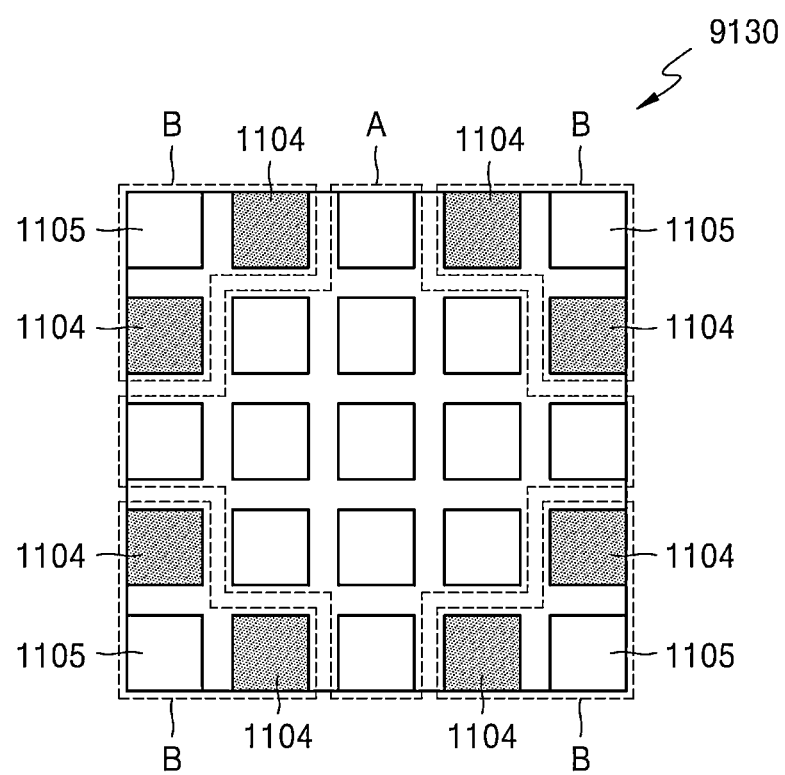
FIG. 16 illustrates a unit filter array according to another example embodiment.

FIG. 16 illustrates a unit filter array 9130 according to another example embodiment Referring to FIG. 16, the reference filter region B may include the gray filter 1104 and the transparent filter 1105 disposed outside the active filter region A. Here, the gray filter 1104 may be disposed closer to the active filter region A than the transparent filter 1105.

Figure 17:
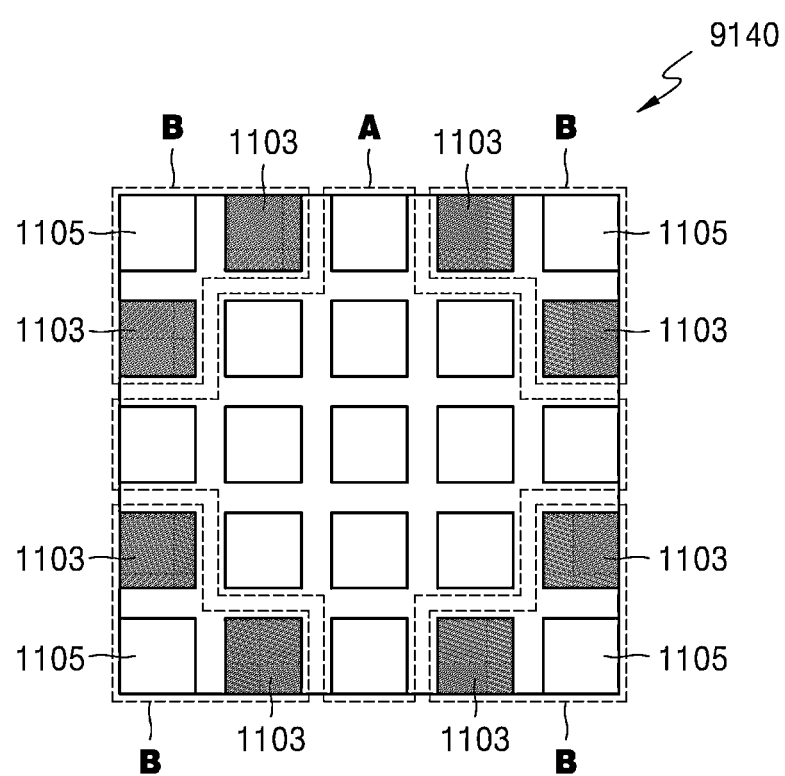
FIG. 17 shows a unit filter array according to another example embodiment.

FIG. 17 illustrates a unit filter array 9140 according to another example embodiment Referring to FIG. 17, the reference filter region B may include the black filter 1103 and the transparent filter 1105 disposed outside the active filter region A. Here, the black filter 1103 may be disposed closer to the active filter region A than the transparent filter 1105.

Figure 18:
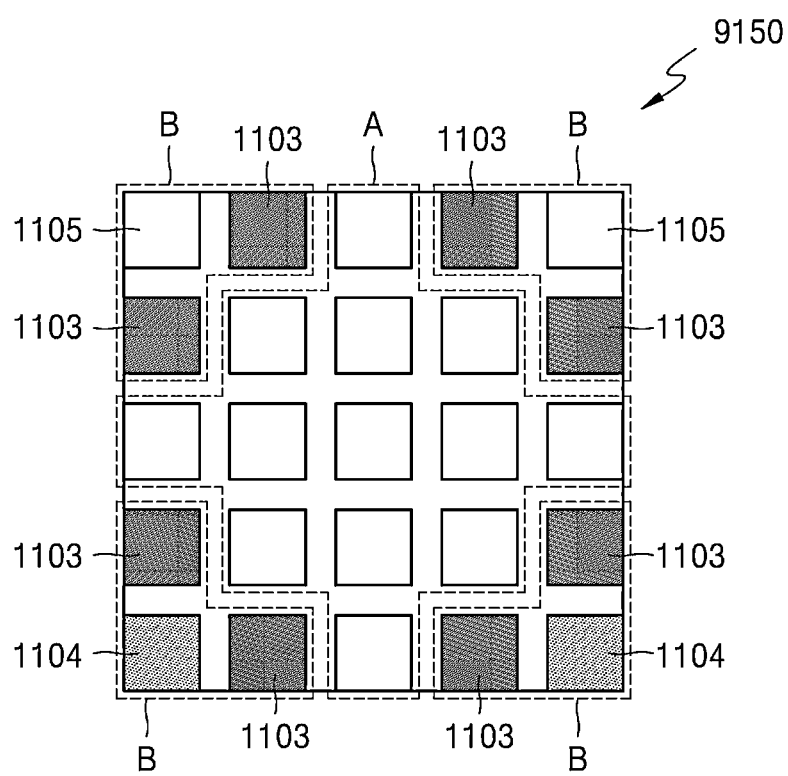
FIG. 18 illustrates a unit filter array according to another example embodiment.

FIG. 18 shows a unit filter array 9150 according to another example embodiment. Referring to FIG. 18, the reference filter region B may include the black filter 1103, the gray filter 1104, and the transparent filter 1105 disposed outside the active filter region A. Here, the black filter 1103 may be disposed closer to the active filter region A than the gray filter 1104 and the transparent filter 1105.

Figure 19:
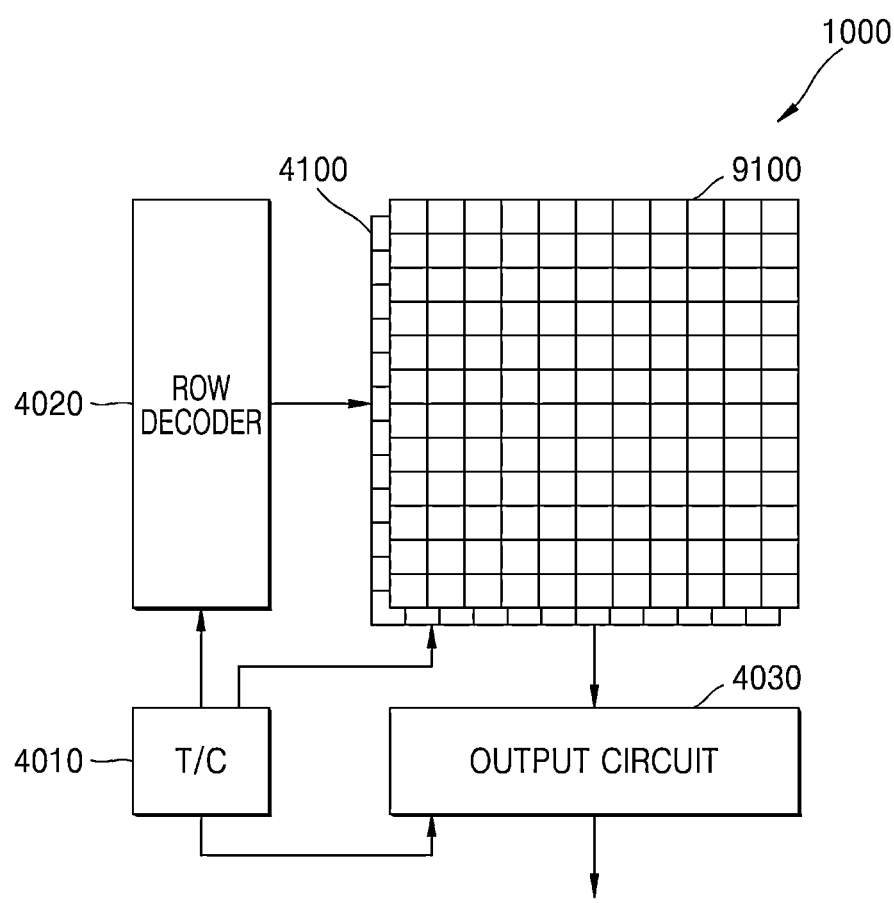
FIG. 19 is a block diagram of an image sensor according to an example embodiment.

FIG. 19 is a schematic block diagram of an image sensor according to an example embodiment.

Referring to FIG. 19, an image sensor 1000 may include an optical filter 9100, the pixel array 4100, a timing controller 4010, a row decoder 4020, and an output circuit 4030. The image sensor may include a CCD image sensor or a CMOS image sensor, but is not limited thereto.

The optical filter 9100 may include a plurality of unit filters respectively transmitting light of different wavelength ranges and being arranged in two dimensions. The optical filter 9100 may be any one of optical filters described in the above mentioned embodiments. The pixel array 4100 includes a plurality of pixels configured to sense light of different wavelength ranges that is transmitted through the plurality of unit filters. In detail, the pixel array 4100 may include pixels arranged in two dimensions in rows and columns. The row decoder 4020 may select one of the rows of the pixel array 4100, in response to a row address signal output from the timing controller 4010. The output circuit 4030 may output light sensing signals in column units from the pixels arranged in the selected row. To this end, the output circuit 4030 may include a column decoder and an analog-to-digital converter (ADC). For example, the output circuit 4030 may include a plurality of ADCs arranged according to columns between the column decoder and the pixel array 4100, or an ADC arranged at an output terminal of the column decoder. The timing controller 4010, the row decoder 4020, and the output circuit 4030 may be implemented as a single chip or individual chips. A processor configured to process image signals output from the output circuit 4030 may be implemented as a single chip together with the timing controller 4010, the row decoder 4020, and the output circuit 4030. The pixel array 4100 includes a plurality of pixels sensing light of different wavelength ranges, and arrangement of the pixels may be implemented in various manners.

The image sensor 1000 including the above-described optical filters may be employed in various high-performance optical devices or high-performance electronic devices. The electronic devices may include, for example, smartphones, mobile phones, cellular phones, personal digital assistants (PDAs), laptop computers, personal computers (PCs), various portable devices, home appliances, security cameras, medical cameras, automobiles, Internet of Things (IoT) devices, and other mobile or non-mobile computing devices, but are not limited thereto.

The electronic devices may further include, in addition to the image sensor 1000, a processor configured to control an image sensor, for example, an application processor (AP), control a number of hardware or software constituent elements by driving operating systems or application programs through the processor, and perform various data processing and calculations. The processors may further include graphics processing units (GPUs) and/or image signal processors. When the processors include image signal processors, an image (or video) obtained through an image sensor may be stored and/or output using the processor.

Figure 20:
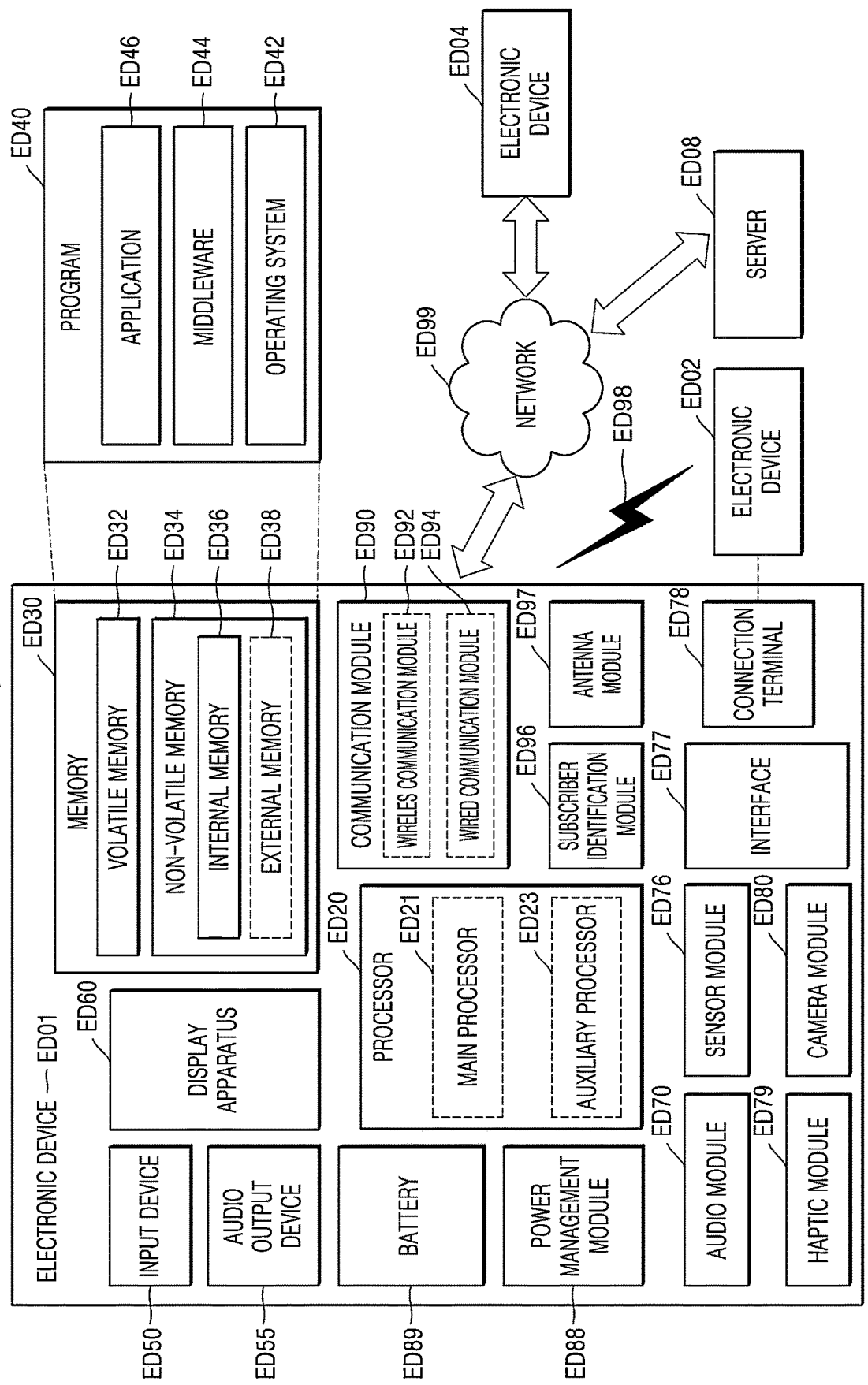
FIG. 20 is a block diagram schematically illustrating an electronic device including an image sensor, according to example embodiments.

FIG. 20 is a schematic block diagram of an electronic device ED01 including the image sensor 1000, according to an embodiment. Referring to FIG. 20, in a network environment ED00, the electronic device ED01 may communicate with another electronic device ED02 through a first network ED98 (e.g., a short-range wireless communication network, and the like), or communicate with another electronic device ED04 and/or a server ED08 through a second network ED99 (e.g., a long-range wireless communication network, and the like). The electronic device ED01 may communicate with the electronic device ED04 through the server ED08. The electronic device ED01 may include a processor ED20, a memory ED30, an input device ED50, an audio output device ED55, a display device ED60, an audio module ED70, a sensor module ED70, an interface ED77, a haptic module ED79, a camera module ED80, a power management module ED88, a battery ED89, a communication module ED90, a subscriber identification module ED96, and/or an antenna module ED97. In the electronic device ED01, some (e.g., the display device ED60, and the like) of constituent elements may be omitted, or other constituent elements may be added. Some of the constituent elements may be implemented by one integrated circuit. For example, the sensor module ED76 (e.g., a fingerprint sensor, an iris sensor, an illuminance sensor, and the like) may be implemented by being embedded in the display device ED60 (e.g., a display, and the like). Furthermore, when the image sensor 1000 includes a spectral function, some functions (e.g., a color sensors and an illuminance sensor) of the sensor module may be implemented by the image sensor 1000, not by a separate sensor module.

The processor ED20 may control one or a plurality of other constituent elements (e.g., hardware and software constituent elements) of the electronic device ED01 connected to the processor ED20 by executing software (e.g., a program ED40), and perform various data processing or calculations. As part of the data processing or calculations, the processor ED20 may load, in a volatile memory ED32, commands and/or data received from other constituent elements (e.g., the sensor module ED76, the communication module ED90), process the command and/or data stored in the volatile memory ED32, and store result data in a non-volatile memory ED34. The processor ED20 may include a main processor ED21 (e.g., a central processing unit, an application processor) and an auxiliary processor ED23 (e.g., a graphics processing unit, an image signal processor, a sensor hub processor, a communication processor) that may be operable independently of or together with the main processor ED21. The auxiliary processor ED23 may use less power than the main processor ED21 and may perform a specialized function.

Instead of the main processor ED21 when the main processor ED21 is in an inactive state (e.g., sleep state), or with the main processor ED21 when the main processor ED21 is in an active state (e.g., application execution state), the auxiliary processor ED23 may control functions and/or states related to some constituent elements (e.g., the display device ED60, the sensor module ED76, the communication module ED90) of the constituent elements of the electronic device ED01. The auxiliary processor ED23 (e.g., an image signal processor, a communication processor) may be implemented as a part of functionally related other constituent elements (e.g., the camera module ED80, the communication module ED90).

The memory ED30 may store various data needed by the constituent elements (e.g., the processor ED20, the sensor module ED76) of the electronic device ED01. The data may include, for example, software (e.g., the program ED40) and input data and/or output data about commands related thereto. The memory ED30 may include the volatile memory ED32 and/or the non-volatile memory ED34. The non-volatile memory ED34 may include an internal memory ED36 fixedly installed in the electronic device ED01 and an external memory ED38 that is removable.

The program ED40 may be stored in the memory ED30 as software, and may include an operating system ED42, middleware ED44, and/or an application ED46.

The input device ED50 may receive commands and/or data to be used for constituent elements (e.g., the processor ED20) of the electronic device ED01, from the outside (e.g., a user) of the electronic device ED01. The input device ED50 may include a microphone, a mouse, a keyboard, and/or a digital pen (e.g., a stylus pen).

The audio output device ED55 may output an audio signal to the outside of the electronic device ED01. The audio output device ED44 may include a speaker and/or a receiver. The speaker may be used for general purposes such as multimedia playback or recording playback, and the receiver may be used to receive incoming calls. The receiver may be implemented by being coupled as a part of the speaker or by an independent separate device.

The display device ED60 may visually provide information to the outside of the electronic device ED01. The display device ED60 may include a display, a hologram device, or a projector, and a control circuit to control a corresponding device. The display device ED60 may include a touch circuitry set to detect a touch and/or a sensor circuit (e.g., a pressure sensor) set to measure the strength of a force generated by the touch.

The audio module ED70 may convert sound into electrical signals or reversely electrical signals into sound. The audio module ED70 may obtain sound through the input device ED50, or output sound through a speaker and/or a headphone of another electronic device (e.g., the electronic device ED02) connected to the audio output device ED55 and/or the electronic device ED01 in a wired or wireless manner.

The sensor module ED76 may detect an operation sate (e.g., power, temperature) of the electronic device ED01, or an external environment state (e.g., a user state), and generate an electrical signal and/or a data value corresponding to the detected state. The sensor module ED76 may include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface ED77 may support one or a plurality of specified protocols used for the electronic device ED01 to be connected to another electronic device (e.g., the electronic device ED02) in a wired or wireless manner. The interface ED77 may include a high definition multimedia interface (HDMI), a universal serial bus (USB) interface, an SD card interface, and/or an audio interface.

The connection terminal ED78 may include a connector for the electronic device ED01 to be physically connected to another electronic device (e.g., the electronic device ED02). The connection terminal ED78 may include an HDMI connector, a USB connector, an SD card connector, and/or an audio connector (e.g., a headphone connector, and the like).

The haptic module ED79 may convert electrical signals into mechanical stimuli (e.g., vibrations, movements, and the like) or electrical stimuli that are perceivable by a user through tactile or motor sensations. The haptic module Ed79 may include a motor, a piezoelectric device, and/or an electrical stimulation device.

The camera module ED80 may capture a still image and a video. The camera module ED80 may include a lens assembly including one or a plurality of lenses, the image sensor 1000 of FIG. 1, image signal processors, and/or flashes. The lens assembly included in the camera module ED80 may collect light emitted from a subject for image capturing.

The power management module ED88 may manage power supplied to the electronic device ED01. The power management module ED88 may be implemented as a part of a power management integrated circuit (PMIC).

The battery ED89 may supply power to the constituent elements of the electronic device ED01. The battery ED89 may include non-rechargeable primary cells, rechargeable secondary cells, and/or fuel cells.

The communication module ED90 may establish a wired communication channel and/or a wireless communication channel between the electronic device ED01 and another electronic device (e.g., the electronic device ED02, the electronic device ED04, the server ED08), and support a communication through an established communication channel. The communication module ED90 may be operated independent of the processor ED20 (e.g., the application processor), and may include one or a plurality of communication processors supporting a wired communication and/or a wireless communication. The communication module ED90 may include a wireless communication module ED92 (e.g., a cellular communication module, a short-range wireless communication module, a global navigation satellite system (GNSS) communication module), and/or a wired communication module ED94 (e.g., a local area network (LAN) communication module, a power line communication module). Among the above communication modules, a corresponding communication module may communicate with another electronic device through the first network ED98 (e.g., a short-range communication network such as Bluetooth, WiFi Direct, or infrared data association (IrDA)) or the second network ED99 (e.g., a long-range communication network such as a cellular network, the Internet, or a computer network (e.g., LAN, WAN)). These various types of communication modules may be integrated into one constituent element (e.g., a single chip), or may be implemented as a plurality of separate constituent elements (e.g., multiple chips). The wireless communication module ED92 may verify and authenticate the electronic device ED01 in a communication network such as the first network ED09 and/or the second network ED99 by using subscriber information (e.g., an international subscriber identifier (I MSI)) stored in the subscriber identification module ED96.

The antenna module ED97 may transmit signals and/or power to the outside (e.g., another electronic device) or receive signals and/or power from the outside. An antenna may include an emitter formed in a conductive pattern on a substrate (e.g., a printed circuit board (PCB)). The antenna module ED97 may include one or a plurality of antennas. When the antenna module ED97 includes a plurality of antennas, the communication module ED90 may select, from among the antennas, an appropriate antenna for a communication method used in a communication network such as the first network ED98 and/or the second network ED99. Signals and/or power may be transmitted or received between the communication module ED90 and another electronic device through the selected antenna. Other parts (e.g., an RFIC) than the antenna may be included as a part of the antenna module ED97.

Some of the constituent elements may be connected to each other through a communication method between peripheral devices (e.g., a bus, general purpose input and output (GPIO), a serial peripheral interface (SPI), a mobile industry processor interface (MIPI)) and may mutually exchange signals (e.g., commands, data).

The command or data may be transmitted or received between the electronic device ED01 and the external electronic device ED04 through the server ED08 connected to the second network ED99. The electronic devices ED02 and ED04 may be of a type that is the same as or different from the electronic device ED01. All or a part of operations executed in the electronic device ED01 may be executed in one or a plurality of the electronic devices (e.g., ED02, ED04, and ED08). For example, when the electronic device ED01 needs to perform a function or service, the electronic device ED01 may request one or a plurality of electronic devices to perform part of the whole of the function or service, instead of performing the function or service. The one or the plurality of electronic devices receiving the request may perform additional function or service related to the request, and transmit a result of the performance to the electronic device ED01. To this end, cloud computing, distributed computing, and/or client-server computing technology may be used.

Figure 21:
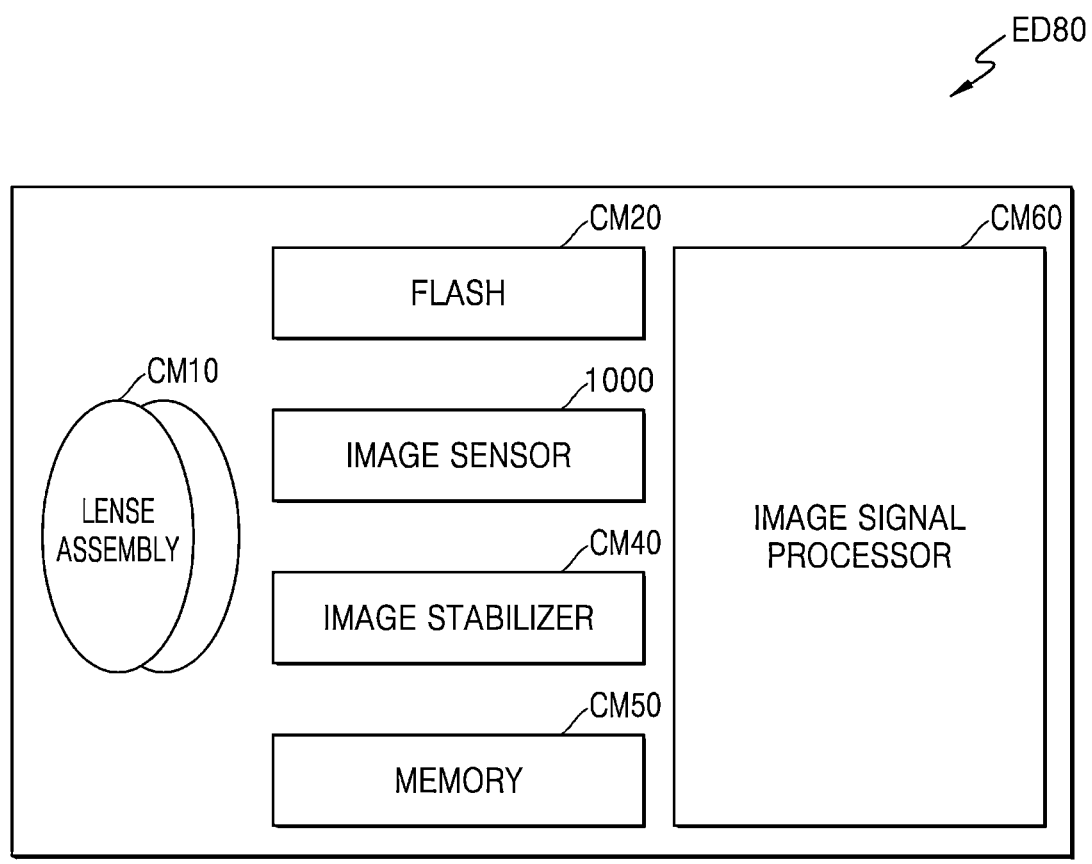
FIG. 21 is a block diagram schematically illustrating a camera module of FIG. 20.

FIG. 21 is a block diagram of the camera module ED80 of FIG. 20. Referring to FIG. 21, the camera module ED80 may include a lens assembly CM10, a flash CM20, the image sensor 1000 (e.g., the image sensor 1000 of FIG. 17), an image stabilizer CM40, a memory CM50 (e.g., a buffer memory), and/or an image signal processor CM60. The lens assembly CM10 may collect light emitted from a subject for image capturing. The camera module ED80 may include a plurality of lens assemblies CM10, and in this case, the camera module ED80 may include a dual camera, a 360 degrees camera, or a spherical camera. Some of the lens assemblies CM10 may have the same lens attributes (e.g., a viewing angle, a focal length, auto focus, F number, optical zoom), or different lens attributes. The lens assembly CM10 may include a wide angle lens or a telescopic lens.

The flash CM20 may emit light used to reinforce light emitted or reflected from a subject. The flash CM20 may include one or a plurality of light-emitting diodes (e.g., a red-green-blue (RGB) LED, a white LED, an infrared LED, an ultraviolet LED), and/or a xenon lamp. The image sensor 1000 may include the image sensor of FIG. 1, and convert light emitted or reflected from the subject and transmitted through the lens assembly CM10 into electrical signals, thereby obtaining an image corresponding to the subject. The image sensor 1000 may include one or a plurality of sensors selected from among image sensors having different attributes such as an RGB sensor, a black and white (BW) sensor, an IR sensor, or a UV sensor. Each sensor included in the image sensor 1000 may be implemented by a charged coupled device (CCD) sensor and/or a complementary metal oxide semiconductor (CMOS) sensor.

The image stabilizer CM40 may move, in response to a movement of the camera module ED80 or an electronic device ED01 including the same, one or a plurality of lenses included in the lens assembly CM10 or the image sensor 1000 in a particular direction or may compensate a negative effect due to the movement by controlling (e.g., adjusting a read-out timing) the movement characteristics of the image sensor 1000. The image stabilizer CM40 may detect a movement of the camera module ED80 or the electronic device ED01 by using a gyro sensor or an acceleration sensor arranged inside or outside the camera module ED80. The image stabilizer CM40 may be implemented in an optical form.

The memory CM50 may store a part or the entire data of an image obtained through the image sensor 1000 for a subsequent image processing operation. For example, when a plurality of images are obtained at a high speed, only low resolution images may be displayed while the obtained original data (e.g., Bayer-Patterned data, high resolution data may be stored in the memory CM50. Then, the memory CM50 may be used to transmit the original data or a selected (e.g., user selection) image to the image signal processor CM60. The memory CM50 may be incorporated into the memory ED30 of the electronic device ED01, or configured to be a separate memory that is independently operated.

The image signal processor CM60 may perform image processing on the image obtained through the image sensor 1000 or the image data stored in the memory CM50. The image processing may include depth map generation, three-dimensional modeling, panorama generation, feature point extraction, image synthesis, and/or image compensation (e.g., noise reduction, resolution adjustment, brightness adjustment, blurring, sharpening, softening). The image signal processor CM60 may perform control (e.g., exposure time control, or read-out timing control) on constituent elements (e.g., the image sensor 1000) included in the camera module ED80. The image processed by the image signal processor CM60 may be stored again in the memory CM50 for additional processing or provided to external constituent elements (e.g., the memory ED30, the display device ED60, the electronic device ED02, the electronic device ED04, the server ED08) of the camera module ED80. The image signal processor CM60 may be incorporated into the processor ED20, or configured to a separate processor that is operated independent of the processor ED20. When the image signal processor CM60 is configured by a separate processor from the processor ED20, the image processed by the image signal processor CM60 may undergo additional image processing by the processor ED20 and then displayed through the display device ED60.

The electronic device ED01 may include a plurality of camera modules ED80 having different attributes or functions. In this case, one of the camera modules ED80 may include a wide angle camera, and another may include a telescopic camera. Similarly, one of the camera modules ED80 may include a front side camera, and another may include a rear side camera.

Figure 22A:
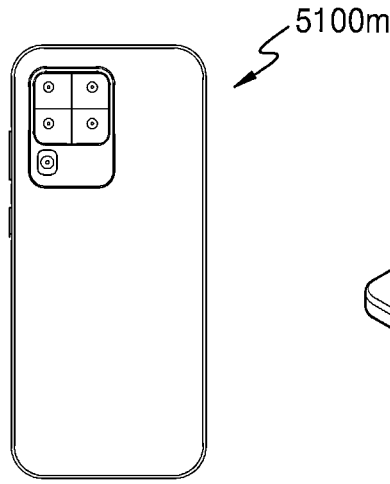
FIGS. 22A through 23E are diagrams illustrating various examples of electronic devices having image sensors applied thereto, according to example embodiments.
Figure 22B:
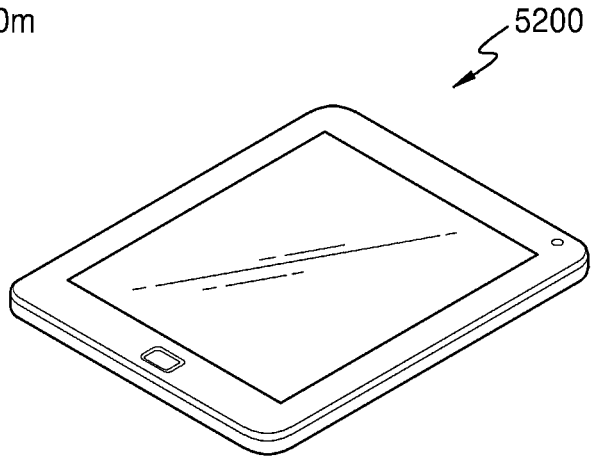
Figure 22C:
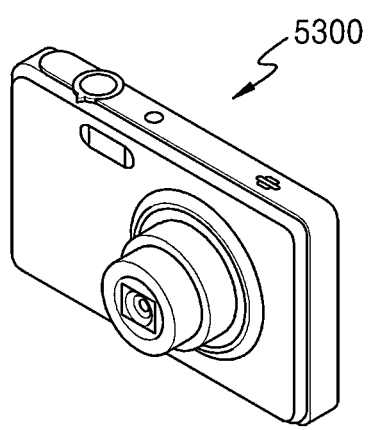
Figure 22D:
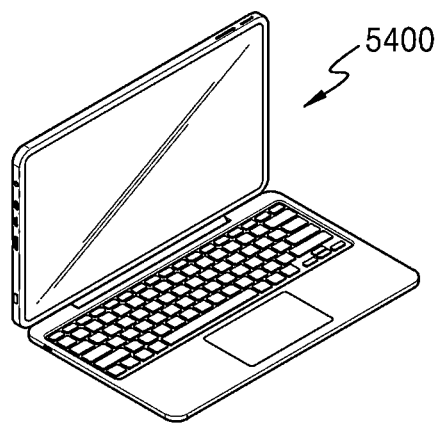
Figure 22E:
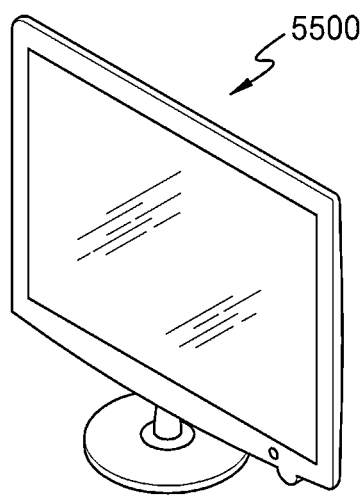

The image sensor 1000 according to embodiments may be applied to a mobile phone or smartphone 5100$m$ illustrated in FIG. 22A, a tablet or smart tablet 5200 illustrated in FIG. 22B, a digital camera or camcorder 5300 illustrated in FIG. 22C, a notebook computer 5400 illustrated in FIG. 22D, a television or smart television 5500 illustrated in FIG. 22E, or other electronic devices. For example, the smartphone 5100$m$ or the smart tablet 5200 may include a plurality of high resolution cameras, each having a high resolution image sensor mounted thereon. Depth information of subjects in an image may be extracted by using a high resolution cameras, out focusing of the image may be adjusted, or subjects in the image may be automatically identified.

Figure 23A:
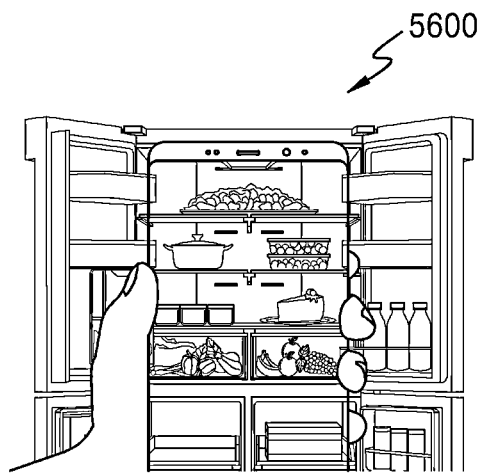
Figure 23B:
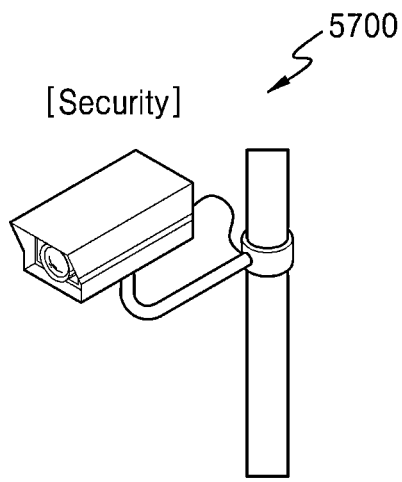
Figure 23C:
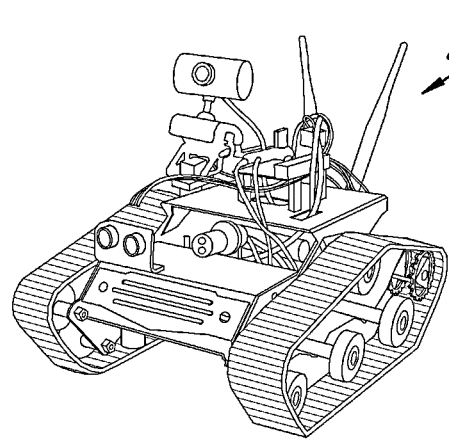
Figure 23D:
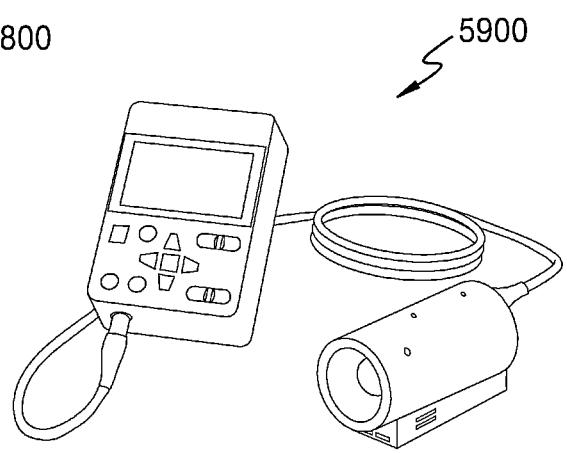

Furthermore, the image sensor 1000 may be applied to a smart refrigerator 5600 illustrated in FIG. 23A, a security camera illustrated in FIG. 23B, a robot 5800 illustrated in FIG. 23C, a medical camera 5900 illustrated in of FIG. 23D, and other electronic devices. For example, the smart refrigerator 5600 may automatically recognize food in a refrigerator, by using an image sensor, and notify a user of the presence of a particular food, the type of food that is input or output, through a smartphone. The security camera 5700 may provide an ultrahigh resolution image and may recognize an object or a person in an image in a dark environment by using high sensitivity. The robot 5800 may be provided in a disaster or industrial site that is not directly accessible by people, and may provide a high resolution image. The medical camera 5900 may provide a high resolution image for diagnosis or surgery, and thus a field of vision may be dynamically adjusted.

Figure 23E:
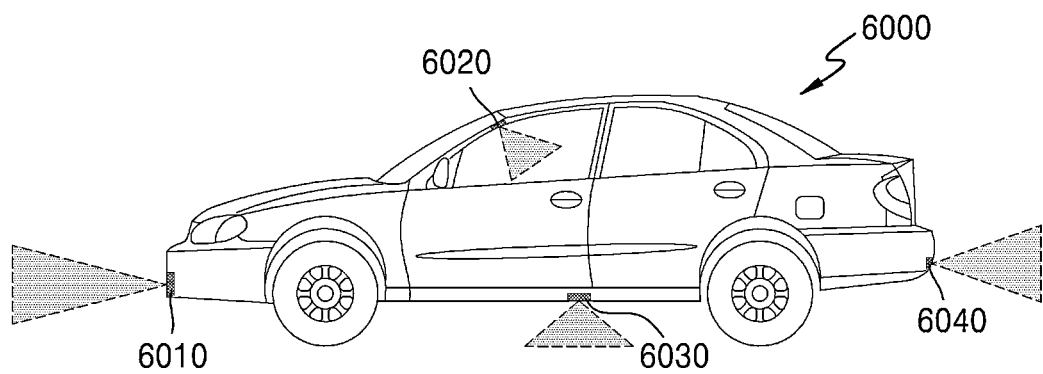

Furthermore, the image sensor 1000 may be applied to a vehicle 6000 as illustrated in FIG. 23E. The vehicle 6000 may include a plurality of vehicle cameras 6010, 6020, 6030, and 6040 arranged at various positions. Each of the vehicle cameras 6010, 6020, 6030, and 6040 may include an image sensor according to an embodiment. The vehicle 6000 may provide a driver with various pieces of information about the inside or periphery of the vehicle 6000, by using the vehicle cameras 6010, 6020, 6030, and 6040, and thus an object or a person in an image may be automatically recognized and information used for autonomous driving may be provided.

According to the above example embodiment, the optical filter may include the reference filter region provided around the active filter region, thereby accurately measuring the amount of light passing through the active filter region. The intensity of the light passing through the black filter and the transparent filter may be used as a reference value, and the reference value may be compared with the intensity of the light passing through the spectral filter, thereby accurately measuring the minute difference in the amount of light between the spectral unit filters. In addition, the gray filter having a transmittance higher than that of the black filter and lower than that of the transparent filter may be disposed between the black filter and the transparent filter, the amount of light passing through the gray filter may be used as a reference value, and the reference value may be compared with the amount of light passing through the spectral filter, thereby more accurately measuring the minute difference in the amount of light between the spectral unit filters. Accordingly, sensing values of the active pixels with respect to the light passing through the spectral filter may be more accurately obtained.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An optical filter comprising:
   an active filter region comprising at least one of a spectral filter and a polarizing filter; and
   a reference filter region configured to sense an amount of light passing through the active filter region,
   wherein the reference filter region comprises a gray filter, a black filter, and a transparent filter,
   wherein the gray filter has a transmittance that is higher than a transmittance of the black filter and lower than a transmittance of the transparent filter,
   wherein an entirety of the reference filter region is outside of an entirety of the active filter region, and
   wherein the transparent filter is outside of the gray filter.

2. The optical filter of claim 1, wherein the transmittance of the gray filter is in a range of 5% to 90%.

3. The optical filter of claim 1, wherein the gray filter comprises a plurality of partial gray filters having transmittances that are different from one another.

4. The optical filter of claim 1, wherein the reference filter region comprises the black filter and the gray filter,
   the black filter is outside of the active filter region, and
   the gray filter is outside of the black filter.

5. The optical filter of claim 1, further comprising:
   a plurality of unit filter arrays;
   a plurality of active filter regions including the active filter region; and
   a plurality of reference filter regions including the reference filter region,
   wherein each of the plurality of unit filter arrays comprises a corresponding active filter region of the plurality of active filter regions and a corresponding reference filter region of the plurality of reference filter regions.

6. The optical filter of claim 5, wherein each of the plurality of reference filter regions comprises the black filter and the gray filter.

7. The optical filter of claim 6, wherein each of the plurality of reference filter regions further comprises the transparent filter.

8. The optical filter of claim 5, wherein each of the plurality of reference filter regions comprises the gray filter and the transparent filter.

9. The optical filter of claim 1, wherein the active filter region comprises the spectral filter, and
   wherein the spectral filter comprises at least four spectral unit filters having central wavelengths that are different from one another.

10. The optical filter of claim 9, wherein each of the four or more spectral unit filters comprises a lower metal reflective plate and an upper metal reflective plate,
    wherein the lower metal reflective plate defines a first cavity, and
    wherein the upper metal reflective plate is provided in the first cavity.

11. The optical filter of claim 1, wherein the active filter region comprises the polarizing filter, and
    wherein the polarizing filter comprises a plurality of polarizing unit filters having central wavelengths that are different from one another.

12. The optical filter of claim 11, wherein each of the plurality of polarizing unit filters comprises a lower metal reflective plate and a polarizer,
    wherein the lower metal reflective plate defines a second cavity, and
    wherein the polarizer is provided in the second cavity.

13. An optical filter comprising:
an active filter region comprising at least one of a spectral filter and a polarizing filter; and
a reference filter region configured to sense an amount of light passing through the active filter region, the reference filter region comprising a black filter, a gray filter, and a transparent filter, and
wherein an entirety of the reference filter region is outside of an entirety of the active filter region, and
wherein the transparent filter is outside of the gray filter.

14. The optical filter of claim 13, wherein the black filter is outside of the active filter region, and the transparent filter is outside of the black filter.

15. The optical filter of claim 13, further comprising:
a plurality of unit filter arrays;
a plurality of active filter regions including the active filter region;
a plurality of reference filter regions including the reference filter region,
wherein each of the plurality of unit filter arrays comprises a corresponding active filter region of the plurality of active filter regions and a corresponding reference filter region of the plurality of reference filter regions.

16. An image sensor comprising:
a pixel array comprising a plurality of pixels; and
an optical filter provided on the pixel array,
wherein the optical filter comprises:
an active filter region comprising at least one of a spectral filter and a polarizing filter; and
a reference filter region configured to sense an amount of light passing through the active filter region,
wherein the reference filter region comprises a gray filter, a black filter, and a transparent filter,
wherein the gray filter has a transmittance that is higher than a transmittance of the black filter and lower than a transmittance of the transparent filter,
wherein an entirety of the reference filter region is outside of an entirety of the active filter region, and
wherein the transparent filter is outside of the gray filter.

* * * * *